United States Patent [19]

Ozaki et al.

[11] Patent Number: 5,130,787
[45] Date of Patent: Jul. 14, 1992

[54] COLOR SIGNAL PROCESSING CIRCUIT WITH RESIDUE PHASE ERROR CORRECTION

[75] Inventors: Hidetoshi Ozaki; Akira Goukura, both of Tokyo, Japan

[73] Assignee: Victor Company of Japan, Ltd., Yokohama, Japan

[21] Appl. No.: 514,487

[22] Filed: Apr. 25, 1990

[30] Foreign Application Priority Data

| Apr. 26, 1989 | [JP] | Japan | 1-106676 |
| Apr. 26, 1989 | [JP] | Japan | 1-106677 |
| Apr. 26, 1989 | [JP] | Japan | 1-106678 |
| Apr. 29, 1989 | [JP] | Japan | 1-110063 |
| Apr. 29, 1989 | [JP] | Japan | 1-110064 |

[51] Int. Cl.$^5$ .............................. H04N 9/455
[52] U.S. Cl. ............................. 358/28; 358/22
[58] Field of Search .......... 358/28, 22 R, 323, 326

[56] References Cited

U.S. PATENT DOCUMENTS

| 4,500,919 | 2/1985 | Schrieber | 358/75 |
| 4,551,749 | 11/1985 | Narita | 358/28 |
| 4,667,223 | 5/1987 | Flamm | 358/28 |
| 4,721,904 | 1/1988 | Ozaki et al. | |
| 4,734,757 | 3/1988 | Akiyama | 358/326 |

FOREIGN PATENT DOCUMENTS

| 61-151473 | 7/1986 | Japan . |
| 61-152190 | 7/1986 | Japan . |
| 2137046 | 9/1984 | United Kingdom . |

Primary Examiner—James J. Groody
Assistant Examiner—Kim Yen Vu
Attorney, Agent, or Firm—Lowe, Price, LeBlanc & Becker

[57] ABSTRACT

A color signal processing circuit which includes a conversion unit for converting two color difference signals, which are equivalent to color difference signals obtained by color demodulation of a color signal by using two color difference axes intersecting perpendicularly to each other. The color difference signals are converted into a color amplitude signal corresponding to the amplitude of the color signal and a color phase signal corresponding to the phase of the color signal. Also included is a signal processing unit for processing at least either of the color amplitude signal and the color phase signal. Thus, it is easy to obtain a color difference signal in which a residual phase error included in the color signal is eliminated.

2 Claims, 24 Drawing Sheets

FIG. 8

TABLE 1

| SIGN BIT OF R-Y DATA | SIGN BIT OF B-Y DATA | CONTROL SIGNAL OUTPUT TO SWITCH 45 | PHASE ANGLE OF OUTPUT SIGNAL TO ADDER 46 |
|---|---|---|---|
| L | L | L | 0° |
| L | H | H | 180° |
| H | L | H | 0° |
| H | H | L | 180° |

FIG. 9

TABLE 2

| OUTPUT OF CKT 49 | OUTPUT OF CKT 50 | SIGN BIT OF R-Y DATA | SIGN BIT OF B-Y DATA | OUTPUT |
|---|---|---|---|---|
| H | L | X | L | ② |
| H | L | X | H | ④ |
| L | H | L | X | ③ |
| L | H | H | X | ⑤ |
| OTHER CASES ||||①|

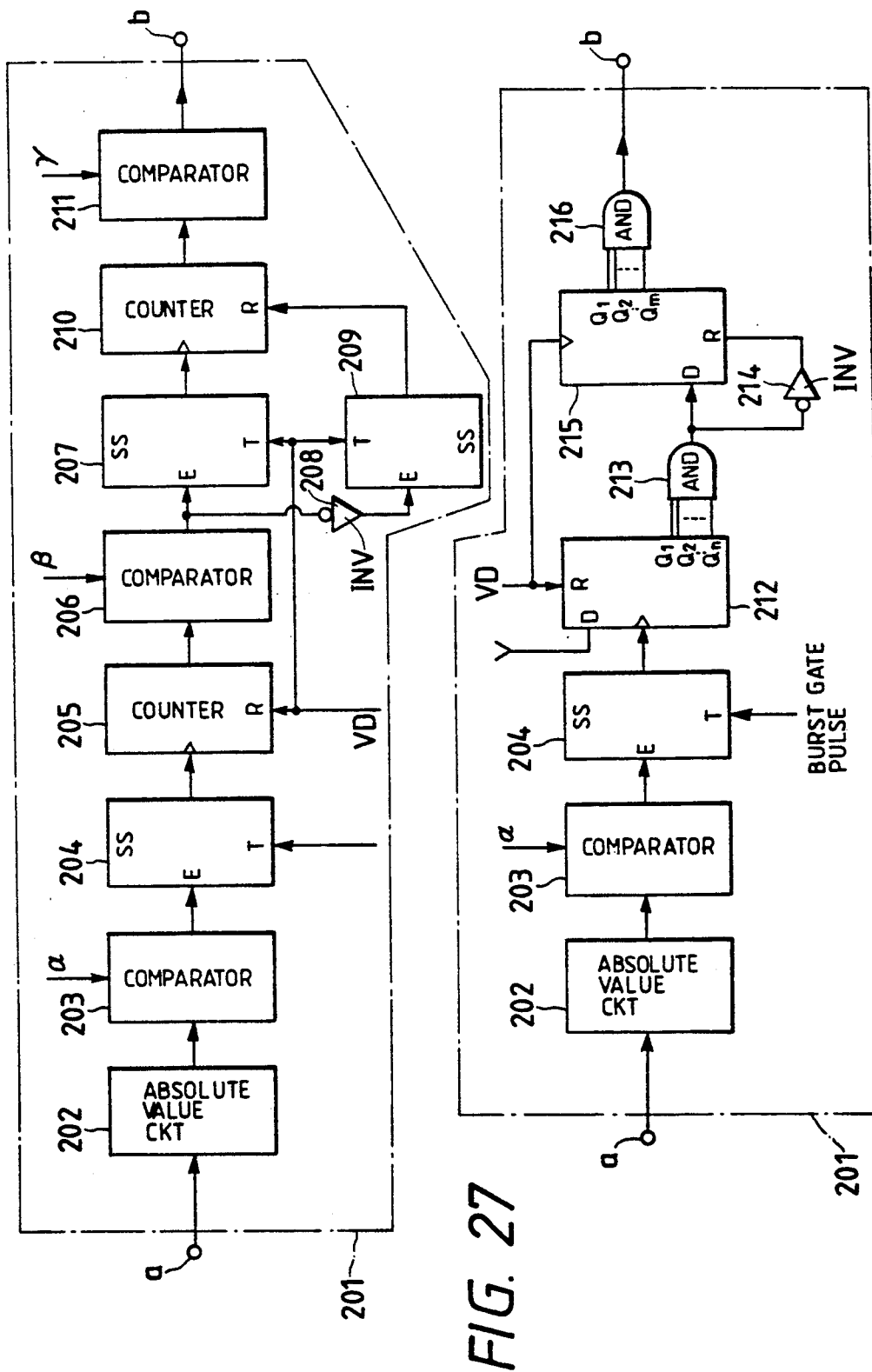

COLOR SIGNAL PROCESSING CIRCUIT WITH RESIDUE PHASE ERROR CORRECTION

BACKGROUND OF THE INVENTION

1. Field of the Invention

This invention generally relates to a color signal processing circuit (hereunder sometimes referred to as a color signal circuit). More particularly, this invention relates to a color signal circuit, which can be applied to various equipment, having an automatic phase control (APC) circuit provided in a portion for generating a carrier to be used in a frequency conversion and color demodulation operations of a carrier chrominance signal, to a color signal circuit having an automatic color control function and to a hue control circuit for controlling a hue of a color indicated by a color difference signal.

2. Description of the Related Art

There has been a color signal circuit for use in various equipment such as a color television receiver and a color video tape recorder (VTR) which is provided with an APC circuit in a portion for generating a carrier to be used in the signal processing thereof.

FIG. 10 is a schematic block diagram for showing the construction of an example of a conventional APC circuit provided in the playback system of a color VTR which is adapted to shift the phase of a low frequency band carrier chrominance signal by 90 degrees every horizontal scanning period (hereunder sometimes referred to simply as 1-H period) and reverse the direction of the phase shift of the low frequency band carrier chrominance signal at every sequential video track and record and playback a signal obtained by the frequency division multiplexing of the low frequency band carrier chrominance signal and a low frequency band modulated luminance signal.

In the conventional APC circuit of FIG. 10, reference numeral 1 denotes an input terminal for receiving a reproduced color signal (that is, a reproduced low frequency band carrier chrominance signal); 2 an automatic chroma control circuit (hereunder referred to as a color control (ACC) circuit) for automatically adjusting the signal level of a color signal to a predetermined value; 3 and 9 frequency conversion circuits; 4 and 10 band-pass filters (hereunder sometimes abbreviated as BPFs); 5 (½)-burst circuit; 6 a 1-H delay line; 7 a color killer circuit; 8 an automatic frequency control (AFC) circuit; 11 a variable crystal oscillator (VCO); 12 a reference crystal oscillator; 13 and 16 phase comparison circuits; 14 a burst gate circuit; 15 a color killer detection circuit; 17 a phase shifting circuit (hereunder sometimes referred to as a phase shifter) for shifting the phase of an input signal thereto by 90 degrees; and 18 an adder. Incidentally, a reference chrominance subcarrier is supplied from the crystal oscillating circuit 12 to the phase comparison circuit 13. Further, the reproduced low frequency band carrier chrominance signal is supplied from the AFC circuit to the frequency conversion circuit.

In case of this APC circuit, first, the ACC circuit 2 makes the signal level of a low frequency band carrier chrominance signal constant and then supplies the low frequency band carrier chrominance signal to the frequency conversion circuit 3. Subsequently, a carrier chrominance signal is obtained by effecting a frequency conversion operation in the frequency conversion circuit 3. Further, a well-known automatic phase control operation is performed on the thus obtained carrier chrominance signal by a closed loop comprised of the frequency conversion circuit 3, the band-pass filter 4, the (½)-burst circuit 5, a comb type filter, which is composed of the 1-H delay line 6 and the adder 18, the burst gate circuit 14, the phase comparison circuit 13, the VCO 11, the frequency conversion circuit 9 and the band-pass filter 10.

Furthermore, in this conventional APC circuit, the phase of a color burst signal obtained by the burst gate circuit 14 and that of the reference chrominance subcarrier issued by the crystal oscillating circuit 12 are compared by the phase comparison circuit 13 which outputs a phase error signal to the VCO 11 to change the frequency of the oscillation thereof.

If the conventional APC circuit has infinite d.c. gain and does not include a delaying element such as a loop filter, a phase control operation of controlling the change of the phase of the reproduced color signal (that is, the reproduced low frequency band carrier chrominance signal) can be performed without delay time. The APC circuit, however, cannot have infinite d.c. gain. In other words, a practical APC circuit has inevitably a residual phase error. Further, in case where a phased lock loop (PLL) type circuit is employed as the phase comparison circuit, a residual phase error is caused due to an operating principle of the PLL. Thus, the APC circuit effects an APC operation at a finite speed of response.

Further, the reproduced color signal (that is, the reproduced low frequency band carrier chrominance signal) are usually mixed with noises resulting from various origin, so that the signal-to-noise ratio (S/N) is deteriorated.

Furthermore, in case where the color burst signal obtained by the burst gate circuit 14 of the conventional APC circuit is mixed with noises, the phase comparison circuit 13 outputs a phase error signal caused due to the presence of noises even when the phase of the color burst signal obtained by the burst gate circuit 14 is correct.

The APC circuit performs the APC operation in such a manner to cancel the phase error signal having occurred in response to the noises which are mixed with the color burst signal. Thus, in case where the reproduced color signal is mixed with noises, the phase of the reproduced color signal fluctuate as a result of the operation of the APC circuit. Further, this results in the occurrence of color deviation in a reproduced image.

The color deviation thus generated in the reproduced image, however, can be reduced to some extent by reducing the speed of response of the APC circuit. Therefore, the APC operation has been performed by the conventional APC circuit under the conditions that an appropriate value of the residual phase error is present.

However, in case of the APC circuit adapted to perform the APC operation in spite of the presence of the residual phase error, a stripe-shaped color deviating portion is generated at specific locations in an image reproduced from the reproduced color signal sent from a color VTR in which, for example, what is called a head beat phenomenon may be caused.

As is well known in the art, in case where a head drum, which has two video heads at the positions of central symmetry on opposite sides thereof, has an additional head at a specific location between the two video heads, this phenomenon may happen when the relative speed of a magnetic tape to the video heads is changed by vibration caused in the tape at the times of making the tape, which is in contact with the video heads, touch the additional head and releasing the tape from the additional head and further the APC circuit cannot respond to change in frequency of the reproduced color signal caused by the change of the relative speed of the tape.

Furthermore, the stripe-shaped color deviating portion generated due to such a phenomenon in the reproduced image is inconspicuous in case that the S/N is deteriorated. In contrast, in case that the S/N is ameliorated by employing, for instance, a recursive type noise reducing circuit including a frame memory or field memory, the color deviating portion becomes clearly perceived.

In order to prevent the occurrence of the color deviation due to such a phenomenon, it is necessary to increase the speed of response of the APC circuit as far as possible. However, as stated above, when the speed of response of the APC circuit is increased, the problem of the color deviation generated in the reproduced image due to the noises mixed up with the color burst signal is brought up. Further, as above described, the conventional APC is adapted to perform the APC operation under the conditions that an appropriate value of the residual phase error is present. Therefore, the conventional APC circuit cannot eliminate or reduce the chance of the occurrence of the color deviation due to the head beat phenomenon.

The present invention is accomplished to resolve the above described problem (hereunder sometimes referred to as a first problem) of the conventional color signal circuit.

It is accordingly an object (hereunder sometimes referred to as a first object) of the present invention to provide a color signal circuit which can easily obtain a color difference signal from which the residual phase error made by the APC operation of the APC circuit to be included in a color signal.

Further, when the APC loop is unlocked due to some cause in the APC circuit of which the response is delayed as described above, there is caused the color deviation in the reproduced image until the APC circuit is restored to a normal APC operating condition.

The color deviation originated from the unlocking of the APC loop of the ACC circuit is often caused due to, for example, the dropout of the reproduced color signal generated by repeating a duplicating operation in the VTR adapted to performing the processing of the low frequency band carrier chrominance signal and the deterioration of the S/N. Especially, a color flicker can be easily caused in an upper portion of the reproduced image by the unlocking of the APC loop occurring immediately posterior to the vertical synchronization signal due to the fact that a color burst signal is not present in a vertical synchronization signal period.

By increasing the speed of response of the APC circuit as far as possible, this problem can be resolved. However, as above described, the conventional APC is adapted to perform the APC operation under the conditions that an appropriate value of the residual phase error is present. Thus, the conventional APC circuit cannot eliminate or reduce the chance of the occurrence of the color flicker.

The present invention is accomplished to also resolve the above described problems of the conventional color signal circuit.

Further, in various equipment such as a color television receiver and a color video tape recorder (VTR), has been used a conventional ACC circuit, for example, as shown in FIG. 29.

In the conventional ACC circuit of FIG. 29, reference numeral 124 denotes a video head; 125 a playback amplifier; 126 a variable gain control circuit; 127 a frequency conversion circuit; 128 a comb type filter; 129 a burst gate circuit; 130 an amplitude detection circuit; and 131 a mixer. Further, a signal reproduced by the video head 124 is amplified by the playback amplifier 125 and is thereafter supplied to the variable gain control circuit 126.

Furthermore, this conventional ACC circuit, which includes a closed loop automatic control system comprised of the variable gain control circuit 126, the frequency conversion circuit 127, the comb type filter 128, the burst gate circuit 129 and the amplitude detection circuit 130, performs an automatic control operation in such a manner to make the amplitude of the color burst signal obtained by the burst gate circuit 129 constant.

This conventional ACC circuit, however, has drawbacks in that the range, in which the output signal level is constant, is narrow owing to the limit to the operating range by the operating source voltage thereof and to the finiteness of the d.c. gain thereof and that the signal level of the output signal is fluctuated when the color burst signal input thereto is mixed with a noise.

Thus, the conventional ACC circuit is made to have a relatively large time constant of the loop filter in order to reduce the fluctuation of the signal level of the output signal caused due to the noise.

Further, in case of the VTR of which a plurality of video heads are sequentially switched from each other with a lapse of time, the color flicker is generated in the reproduced image and thus the picture quality of the reproduced image is deteriorated if there is any difference among the signal levels of the signals reproduced by the plurality of the video heads.

Even in case where there is any difference among the signal levels, if the difference can be compensated by the operation of the ACC circuit, such difference is no consideration. However, as illustrated in FIG. 30, the input/output characteristic of the conventional ACC circuit is not sufficient to compensate the difference among the signal levels of the reproduced color signals. Thus, in case of employing the conventional ACC circuit, the color flicker often occurs.

Further, even in case where the color flicker is generated in the reproduced image due to the above described cause, if the S/N of the color signal is deteriorated, the color flicker may be masked by the noise, so that viewers may not mind the color flicker. In contrast, if the S/N of the reproduced color signal is ameliorated by using, for instance, the recursive type noise reducing circuit which includes the frame memory or the field memory, the color flicker becomes clearly perceived in the reproduced image by the viewers.

The present invention is accomplished to also resolve this problem of the conventional color signal circuit having the ACC circuit.

It is accordingly another object (hereunder sometimes referred to as a second object) of the present invention to provide a color signal circuit which can eliminate or reduce the chance of the occurrence of the color flicker.

Further, in various equipment such as a color television receiver and a color VTR, the conventional process of controlling hue is performed by changing the phase of the carrier used for obtaining the carrier chrominance signal or changing the phase of the color burst signal.

The conventional phase shifter for shifting the phase of the color burst signal and that of the carrier used for obtaining the carrier chrominance signal is usually comprised of an analog circuit. Thus, the characteristics of the conventional phase shifter are liable to largely vary in response to change in ambient temperature. In the prior art, it is therefore very difficult to obtain a hue control device which can stably control the hue.

Furthermore, in the prior art, there is no means for easily controlling the hue of the color indicated by the color signal which is in the form of the color difference signal. Thus, in the conventional equipment which processes the color difference signal, the hue cannot be easily controlled.

The present invention is accomplished to also eliminate this drawback of the prior art.

It is therefore still another object (hereunder sometimes referred to as a third object) of the present invention to provide a color signal circuit which can easily control the hue.

SUMMARY OF THE INVENTION

To achieve the foregoing first object and in accordance with a first aspect of the present invention, there is provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal and a signal processing means for processing at least either of the color amplitude signal and the color phase signal.

In accordance with a second aspect of the present invention, there is provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal, a phase-deviation-quantity signal generating means for generating a phase deviation quantity signal corresponding to the quantity of the phase deviation of the color phase signal outputted from the conversion means in response to a color synchronizing signal, a subtraction means for performing a subtraction operation by letting a value indicated by the color phase signal outputted from the conversion means be a minuend and also letting a value indicated by the phase deviation quantity signal outputted from the phase-deviation-quantity signal be a subtrahend and a color difference signal generating means for generating two color difference signals on the basis of the color amplitude signal and the color phase signal outputted from the subtraction means.

In accordance with a third aspect of the present invention, there is provided a color signal circuit which comprises a data conversion means for converting digital data indicated by two color difference signals, which are equivalent to two color difference signals to be obtained by performing the color demodulation of a carrier chrominance signal including a color burst signal by using two color difference axes intersecting perpendicularly to each other, into digital data indicated by a color amplitude signal corresponding to the amplitude of the color signal and digital data indicated by a color phase signal corresponding to the phase of the color signal, a phase-deviation-quantity data generating means for generating digital data representing the quantity of the phase deviation of the color burst signal outputted from the data conversion means correspondingly to digital data indicated by the color burst signal, a subtraction means for performing a subtraction operation by letting digital color phase data indicated by the color phase signal outputted from the data conversion means be a minuend and also letting phase deviation quantity data indicated by the phase deviation quantity signal outputted from the phase-deviation-quantity signal be a subtrahend and a color difference signal generating means for generating two color difference signals on the basis of the color digital amplitude data and the color phase data outputted from the subtraction means.

Thus, an operation (Asin $\theta$/Acos $\theta$) is first performed on data equivalent to the data indicated by two input color difference signals Asin $\theta$ and Acos $\theta$ to be obtained when the color demodulation of the carrier chrominance signal having an amplitude A and a phase $\theta$ is effected by using the two color difference axes. Then, the color phase signal corresponding to the phase $\theta$ is obtained from the result of the operation tan $\theta$.

Further, a signal corresponding to sin $\theta$ (or cos $\theta$) is obtained from the color phase signal. Then, an operation [Asin $\theta$/sin $\theta$ (or Acos $\theta$/cos $\theta$)] is performed on the thus obtained signal and the input color difference signal Asin $\theta$ (or Acos $\theta$). Thus, the color amplitude signal corresponding to the amplitude A is obtained from the result of this operation.

Furthermore, the phase $\theta$ of the color burst signal included in the input color difference signal is evaluated and is then supplied to the well-known recursive noise reducer type digital filter which includes the frame memory (or the field memory) and a feedback ratio circuit. Thus, the phase deviation quantity signal corresponding to the quantity of the phase deviation of the color burst signal is generated.

Subsequently, the subtraction is effected by letting a value indicated by the color phase signal be a minuend and also letting a value indicated by the phase deviation quantity signal be a subtrahend. Thus, the color phase signal obtained by compensating the phase deviation is generated.

Thereby, can be easily obtained the color difference signal in which the residual phase error included in the color signal is eliminated by performing the APC operation of the APC circuit. Thus, the first problem of the conventional color signal circuit can be preferably resolved.

To achieve the foregoing second object and in accordance with a fourth aspect of the present invention, there is provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal, a difference signal generating means for generating in response to a color synchronizing signal a difference signal representing the difference of a current color signal outputted by the conversion means from the average or mean of the past color phase signals, a nonlinear signal processing means for nonlinearly changing an output thereof depending on the magnitude of the difference signal generated by the difference signal generating means and the current color phase signal, a subtraction means for performing a subtraction operation by letting a value indicated by the current color phase signal outputted from the conversion means be a minuend and also letting a value indicated by the output signal of the nonlinear processing means be a subtrahend and a color difference signal generating means for generating two color difference signals on the basis of the color amplitude signal and the color phase signal outputted from the subtracting means.

Further, in accordance with a fifth aspect of the present invention, there is provided a color signal circuit which comprises a conversion means for converting digital data represented by two color difference signals, which are equivalent to two color difference signals to be obtained by performing the color demodulation of a carrier chrominance signal including a color burst signal by using two color difference axes intersecting perpendicularly to each other, into color amplitude digital data corresponding to the amplitude of the carrier chrominance signal and digital color phase data corresponding to the phase of the carrier chrominance signal, a difference signal data generating means for generating correspondingly to the digital data indicated by the color burst signal data corresponding to the difference of the current phase of the color burst signal outputted from the data conversion means from the average of the past color phase signals, a nonlinear signal processing means of which the output nonlinearly changes depending on the magnitude of the difference signal generated by the difference signal generating means and the current color phase signal, a subtraction means for performing a subtraction operation by letting the digital color phase data outputted from the conversion means be a minuend signal and also letting an output signal outputted from the nonlinear signal processing means be a subtrahend signal and a color difference signal generating means for generating two color difference signals on the basis of the digital color amplitude data and the digital color phase data outputted from the subtracting means.

Furthermore, in accordance with a sixth aspect of the present invention, there is provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal, a difference signal generating means for generating in response to a color synchronizing signal a difference signal representing the difference of a current color signal outputted by the conversion means from the average of the past color phase signals, a nonlinear signal processing means for nonlinearly changing an output thereof depending on the magnitude of the difference signal generated by the difference signal generating means and the current color phase signal, a first subtraction means for performing a subtraction operation by letting a current color phase signal outputted from the conversion means be a minuend and also letting a value indicated by the output signal of the nonlinear processing means be a subtrahend, a phase-deviation-quantity signal generating means for generating a phase deviation signal corresponding to a phase deviation quantity of the color phase signal outputted from the conversion means, a second subtraction means for performing a subtraction operation by letting data indicated by the color phase signal outputted from the first subtraction means be a minuend and also letting data indicated by the phase deviation quantity signal outputted from the phase-deviation-quantity signal generating means be a subtrahend and a color difference signal generating means for generating two color difference signals on the basis of the color amplitude signal and the color phase signal outputted from the first subtracting means.

Thus, similarly as in cases of the color signal circuits in accordance with the first, second and third aspects of the present invention, an operation (Asin $\theta$/Acos $\theta$) is first performed on data equivalent to the data indicated by two input color difference signals Asin $\theta$ and Acos $\theta$ to be obtained when the color demodulation of the carrier chrominance signal having an amplitude A and a phase $\theta$ is effected by using the two color difference axes. Then, the color phase signal corresponding to the phase $\theta$ is obtained from the result of the operation tan $\theta$.

Further, a signal corresponding to sin $\theta$ (or cos $\theta$) is obtained from the color phase signal. Then, an operation [Asin $\theta$/sin $\theta$ (or Acos $\theta$/cos $\theta$)] is performed on the thus obtained signal and the input color difference signal Asin $\theta$ (or Acos $\theta$). Thus, the color amplitude signal corresponding to the amplitude A is obtained from the result of this operation.

Furthermore, the phase $\theta'$ of the color burst signal included in the input color difference signal is evaluated and is then supplied to the well-known recursive noise reducer type digital filter which includes the frame memory (or the field memory) and a feedback ratio circuit. Thus, the difference signal corresponding to the difference of the current phase of the color burst signal from the average of the phase of the past color burst signal is generated.

Then, the difference signal is supplied to the nonlinear signal processing means of which the output changes depending on the magnitude of the difference signal.

Subsequently, the subtraction is effected by letting data indicated by the color phase signal be a minuend and also letting data indicated by the output of the nonlinear signal processing means be a subtrahend. Thus, the color phase signal obtained by compensating the phase deviation is generated.

Further, as a result of supplying the phase $\theta'$ of the color burst signal included in the input color difference signal and evaluated as above described to the well-known recursive noise reducer type digital filter which includes the frame memory (or the field memory) and a feedback ratio circuit, the phase deviation quantity signal corresponding to the phase deviation quantity of the color burst signal is generated.

Subsequently, the subtraction is effected by letting data indicated by the compensated color phase signal obtained by subtracting the data indicated by the output signal of the nonlinear signal processing means from that indicated by the color phase signal as above described be a minuend and also letting data indicated by the phase deviation quantity signal be a subtrahend. Then, the color signal having predetermined form is generated by using the color phase signal obtained by compensating the phase deviation and the color amplitude signal.

Thereby, the change in phase of the color phase signal, which is large enough to cause the color flicker in the reproduced image, can be easily reduced. Further, can be easily obtained the color difference signal in which the residual phase error included in the color signal is eliminated by performing the APC operation of the APC circuit. Thus, the second problem of the conventional color signal circuit can be preferably resolved.

However, the color signal circuits according to the first to sixth aspects of the present invention have the drawback, which will be explained later in detail, that in case where an object to be processed is switched to another color signal from a different or new signal source, when the phase of the color burst signal corresponding to the color signal from the new signal source is largely changed from that of the color burst signal corresponding to the color signal from the former signal source, it takes relatively long time till the color signal circuit returns to normal conditions. The present invention is accomplished to further eliminate this drawback.

Therefore, it is further object (hereunder sometimes referred to as a fourth object) of the present invention is to provide a color signal circuit which can quickly return to the normal conditions even in case where an object to be processed is switched to another color signal from a new signal source and further the phase of the color burst signal corresponding to the color signal from the new signal source is largely changed from that of the color burst signal corresponding to the color signal from the former signal source.

To achieve the foregoing fourth object and in accordance with a seventh aspect of the present invention, there is provided a color signal circuit which comprises an average value data generating means for obtaining data on the average or mean of the values indicated by the past color signals by supplying data indicated by the color phase signal, which corresponds to the phase of the color signal obtained on the basis of two color difference signals having the signal form similar to the two color difference signals to be obtained by effecting the color demodulation of a color signal by using two color difference axes intersecting perpendicularly to each other, of the period of the color synchronizing signal to the recursive type digital filter which includes a memory capable of storing a signal having a period obtained by multiplying a vertical scanning period by an integer, an arithmetic circuit and a feedback ratio circuit having a high feedback ratio, a first counting means for comparing data indicated by the color phase signal based on the current color synchronizing signal with the data generated by the average value data generating means indicating the average of the values indicated by the past color phase signals and counting the number of the data indicated by the color phase signal, of which the difference from the average value of the past color phase signal is equal to or larger than a predetermined value, every vertical scanning period and a feedback ratio changing means for reducing the feedback ratio of the feed back ratio circuit when the number of the vertical scanning periods, in which the count obtained by the first counting means is in excess of a predetermined value, exceeds a predetermined value.

Further, in accordance with an eighth aspect of the present invention, there is provided a color signal circuit which comprises an average value data generating means for obtaining data on the average or mean of the values indicated by the past color signals by supplying data indicated by the color phase signal, which corresponds to the phase of the color signal obtained on the basis of two color difference signals having the signal form similar to the two color difference signals to be obtained by effecting the color demodulation of a color signal by using two color difference axes intersecting perpendicularly to each other, of the period of the color synchronizing signal to the recursive type digital filter which includes a memory capable of storing a signal having a period obtained by multiplying a vertical scanning period by an integer, an arithmetic circuit and a feedback ratio circuit having a high feedback ratio, a first counting means for comparing data indicated by the color phase signal based on the current color synchronizing signal with the data generated by the average value data generating means indicating the average of the values indicated by the past color phase signal and counting the number of the data indicated by the color phase signal, of which the difference from the average value of the past color phase signal is equal to or larger than a predetermined value, every vertical scanning period, a feedback ratio changing means for reducing the feedback ratio of the feedback ratio circuit when the number of the vertical scanning periods, in which the count obtained by the first counting means is in excess of a predetermined value, exceeds a predetermined value and a phase-deviation-quantity signal generating means for generating the phase deviation quantity signal corresponding to the quantity of the phase deviation of the color phase signal from the digital filter.

Namely, in the color signal circuit, the data on the average of the values indicated by the past color phase signals is first obtained by supplying data indicated by the color phase signal, which corresponds to the phase of the color signal obtained on the basis of two color difference signals having the signal form similar to the two color difference signals to be obtained by effecting the color demodulation of a color signal by using two color difference axes intersecting perpendicularly to each other, of the period of the color synchronizing signal to the recursive type digital filter which includes a memory capable of storing a signal having a period obtained by multiplying a vertical scanning period by an integer, an arithmetic circuit and a feedback ratio circuit having a high feedback ratio.

Then, the data indicated by the color phase signal based on the current color synchronizing signal is compared with the data generated by the average value data generating means indicating the average of the values indicated by the past color phase signal. Further, the number of the data indicated by the color phase signal, of which the difference from the average value of the past color phase signal is equal to or larger than a predetermined value, is counted every vertical scanning period.

Subsequently, the feedback ratio of the feedback ratio circuit is reduced when the number of the vertical scanning periods, in which the count obtained by the first counting means is in excess of a predetermined value, exceeds a predetermined value. Thus, the responsiveness is improved.

Thereby, the foregoing drawback of the color signal circuits according to the first to sixth aspects of the present invention can be favorably eliminated.

To achieve the foregoing second object and in accordance with a ninth aspect of the present invention, there is further provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal, a noise reducing means for reducing noises in the color amplitude signal obtained correspondingly to a color synchronizing signal, a coefficient generating means for generating a coefficient such that when the amplitude of the color amplitude signal is multiplied by the coefficient, a predetermined constant value of the amplitude is obtained, a multiplication means for multiplying the color amplitude signal fed from the noise reducing means by the coefficient fed from the coefficient generating means, a color amplitude signal supplying means for supplying the color amplitude signal outputted from the conversion means to the multiplication means and a color difference signal generating means for generating a predetermined color difference signal on the basis of the color amplitude signal outputted from the multiplication means and the color phase signal outputted from the conversion means.

Thus, similarly as in cases of the color signal circuits in accordance with the first to sixth aspects of the present invention, an operation (A sin $\theta$/A cos $\theta$) is first performed on data equivalent to the data indicated by two input color difference signals A sin $\theta$ and A cos $\theta$ to be obtained when the color demodulation of the carrier chrominance signal having an amplitude A and a phase $\theta$ is effected by using the two color difference axes. Then, the color phase signal corresponding to the phase $\theta$ is obtained from the result of the operation tan $\theta$.

Further, a signal corresponding to sin $\theta$ (or cos $\theta$) is obtained from the color phase signal. Then, an operation [A sin $\theta$/sin $\theta$ (or A cos $\theta$/cos $\theta$)] is performed on the thus obtained signal and the input color difference signal A sin $\theta$ (or A cos $\theta$). Thus, the color amplitude signal corresponding to the amplitude A is obtained from the result of this operation.

Then, the value of the amplitude of the color burst signal included in an input color difference signal is evaluated and a signal representing the evaluated value of the amplitude of the color burst signal is further supplied to the well-known recursive noise reducer type digital filter which includes a frame memory (or a field memory), a feedback ratio circuit and a subtracter, and thus generates the amplitude signal corresponding to the color burst signal from which the noise is eliminated.

Subsequently, the amplitude signal corresponding to the color burst signal, from which the noise is eliminated, is supplied to the coefficient generating means capable of generating a coefficient in such a manner that a predetermined amplitude value is obtained when the value of the amplitude of the color burst signal, from which the noise is eliminated, outputted from the noise reducing means is multiplied by the coefficient. Thus, the coefficient is generated.

Further, a signal indicating the coefficient generated by the coefficient generating means and the color amplitude signal outputted by the conversion means are supplied to the multiplication means, whereupon a color amplitude signal, of which the amplitude is modified or compensated, is generated.

Then, a color signal having the predetermined signal form is generated by using the color amplitude signal, of which the amplitude is thus modified, and the color phase signal.

Thereby, can be eliminated the color flicker and the color unevenness occurring in the reproduced image in case of the color signal circuit using the conventional ACC circuit. Further, the integration of the color signal circuit can be easily realized because an object to be processed is a digital signal. Thus, the unevenness in characteristics of the color signal circuits can be easily eliminated. Furthermore, the manufacturing cost of the color signal circuit can be considerably saved because a storage, of which the storage capacity is 500 words or so, can be used as the frame memory.

To achieve the foregoing third object and in accordance with a tenth aspect of the present invention, there is provided a color signal circuit which comprises a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal, an arithmetic operation means for adding phase shifting data to or subtracting the phase shifting data from data indicated by the color phase signal outputted from the conversion means and a color signal generating means for generating a predetermined color signal on the basis of the color amplitude signal and the color phase signal outputted from the arithmetic operation means.

Thus, similarly as in cases of the color signal circuits in accordance with the first to sixth and ninth aspects of the present invention, an operation (A sin $\theta$/A cos $\theta$) is first performed on data equivalent to the data indicated by two input color difference signals A sin $\theta$ and A cos $\theta$ to be obtained when the color demodulation of the carrier chrominance signal having an amplitude A and a phase $\theta$ is effected by using the two color difference axes. Then, the color phase signal corresponding to the phase $\theta$ is obtained from the result of the operation tan $\theta$.

Further, a signal corresponding to sin $\theta$ (or cos $\theta$) is obtained from the color phase signal. Then, an operation [A sin $\theta$/sin $\theta$ (or A cos $\theta$/cos $\theta$)] is performed on the thus obtained signal and the input color difference signal A sin $\theta$ (or A cos $\theta$). Thus, the color amplitude signal corresponding to the amplitude A is obtained from the result of this operation.

Then, the phase shifting data is added to or subtracted from the data indicated by the color phase signal generated from an input color difference signal. Thus, the phase-shifted color phase signal is generated.

Thereafter, a color signal having a predetermined form is generated by using the phase-shifted color phase signal and the color amplitude signal.

Thereby, the hue can be easily controlled with respect to the color difference signal of which the hue control cannot be easily performed by the conventional color signal circuit. Further, the hue can be accurately controlled because the hue control is effected by the digital signal processing. Moreover, the variation in phase shifting angle due to the change in ambient temperature can be prevented. Furthermore, the hue control circuit can be easily constructed by using integrated circuits. Incidentally, a phase shifting circuit provided in an encoder portion of the conventional color signal circuit can be omitted. Thus, can be easily provided a color signal circuit which can favorably resolve the drawback of the prior art.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 8 and 9 are diagrams for illustrating an operation of the circuit of FIG. 7;

FIG. 16 is a graph for showing the characteristic of a feedback ratio circuit of the embodiments of FIGS. 11-15 and 31;

FIGS. 26 and 27 are schematic block diagrams for showing control circuits having different construction;

DETAILED DESCRIPTION OF THE PREFERRED EMBODIMENTS

Figure 1:
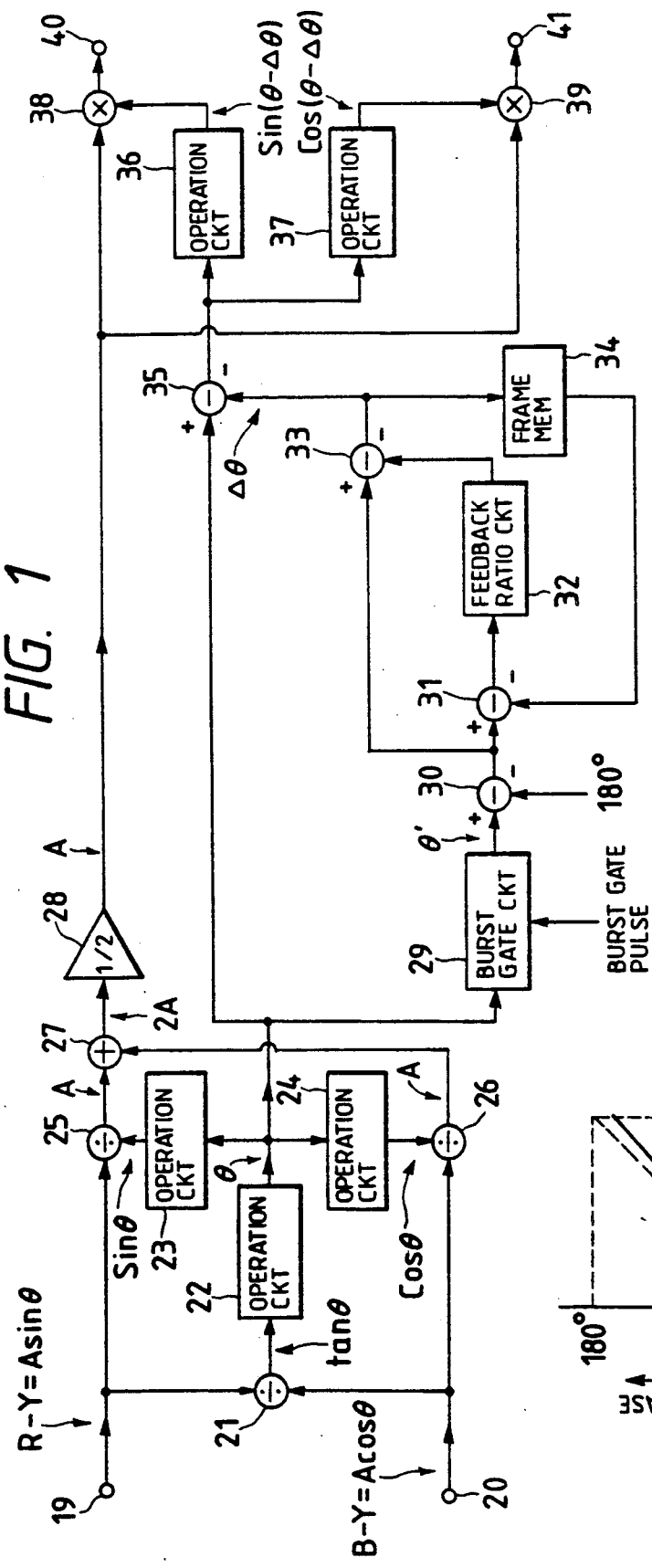
FIGS. 1, 2 and 3 are schematic block diagrams each showing the construction of a different color signal processing circuit embodying the present invention.

Hereinafter, the preferred embodiments of the present invention will be described in detail by referring to the accompanying drawings.

In FIGS. 1-3 and 7, reference numeral 19 designates an input terminal for receiving digital data indicated by one (hereunder described as a color difference signal of red R-Y) of two color difference signals having signal forms similar to the forms of two color difference signals to be obtained by effecting the color demodulation of a carrier chrominance signal by using two color difference axes intersecting perpendicularly to each other; and 20 another input terminal for receiving digital data indicated by the other (hereunder described as a color difference signal of blue B-Y) of the two color difference signals.

Figure 2:
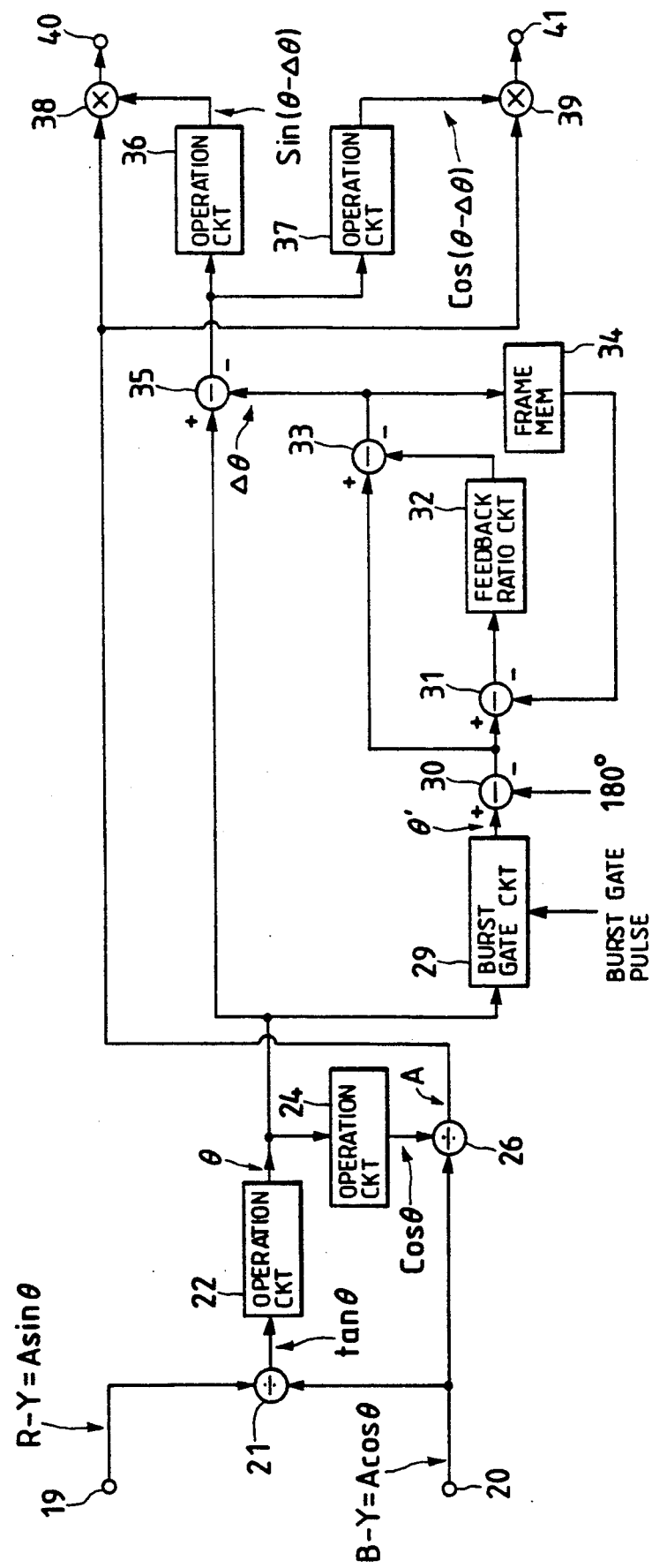
Figure 3:
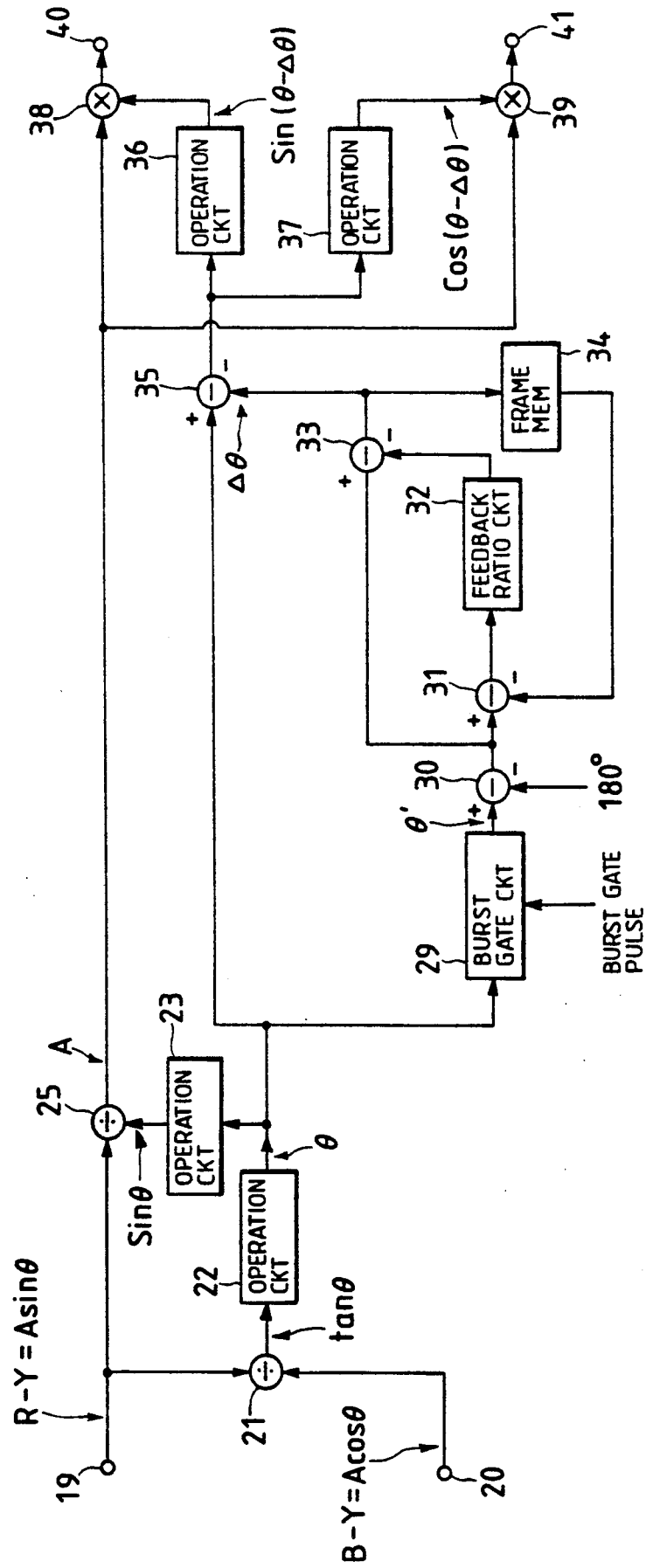

Further, in FIGS. 1-3 for respectively showing different color signal circuits embodying the present invention, reference numerals 21, 25 and 26 denote dividers; 27 an adder; 29 a burst gate circuit; 30, 31, 33 and 35 subtracters; 32 a feedback ratio circuit; 38 and 39 multipliers; 34 a frame memory; 22-24, 28, 36 and 37 arithmetic operation circuits; and 40 and 41 output terminals. Incidentally, the composing element 34 may be a field memory.

Referring to FIGS. 1-3, the digital data indicated by the color difference signal R-Y, which is one of the two color difference signals R-Y and B-Y having the signal forms similar to those of the two color difference signals Asin $\theta$ and Acos $\theta$ to be obtained by performing the color demodulation of a carrier chrominance signal having an amplitude A and a phase $\theta$ by using two color difference axes intersecting perpendicularly to each other, is supplied to the input terminal 19. On the other hand, the digital data indicated by the other color difference signal B-Y is supplied to the input terminal 20.

In the circuits of FIGS. 1-3, the digital data indicated by the signal R-Y is supplied to the divider 21 as a dividend and on the other hand, the digital data indicated by the signal B-Y is supplied to the divider 21 as a divisor. Then, the divider 21 performs an operation represented by the expression Asin $\theta$/Acos $\theta$ (=tan $\theta$) and outputs data corresponding to the results of the operation, namely, tan $\theta$ to the arithmetic operation circuit 22.

Further, the circuit 22 generates data representing the color phase $\theta$ based on the data tan $\theta$ supplied thereto and supplies the data representing the color phase $\theta$ to the burst gate circuit 29 and the divider 35. Moreover, in case of the embodiment of FIG. 1, the data representing the color phase $\theta$ is also supplied to the circuits 23 and 24. Furthermore, in case of the embodiment of FIG. 2, the data $\theta$ is also supplied to the circuit 24. Further, in case of the embodiment of FIG. 3, the data $\theta$ is also supplied to the circuit 23.

In the embodiments of FIGS. 1 and 2, the digital data represented by the expression (B-Y=Acos $\theta$) and inputted to the terminal 20 is supplied to the divider 26 as a dividend. Further, the divider 26 effects an operation represented by the expression (Acos $\theta$/cos $\theta$) and outputs the data indicating the color amplitude A.

In case of the embodiment of FIG. 1, the data representing the color amplitude A outputted from the divider 26 is supplied to the adder 27. Further, in case of the embodiment of FIG. 2, the data representing the color amplitude A outputted from the divider 26 is supplied to the multipliers 38 and 39.

Further, in the embodiments of FIGS. 1 and 3, the digital data represented by the expression (R-Y=A sin $\theta$) supplied to the input terminal 19 is applied to the divider 25 as a dividend. Then, the divider 25 effects the operation represented by the expression (Asin $\theta$/sin $\theta$) and further outputs the data representing the color amplitude A.

Moreover, in the embodiment of FIG. 1, data indicating 2A is outputted from the adder 27 and is further divided by 2 in the circuit 28. The data indicating the color amplitude A is thus obtained and is then fed to the multipliers 38 and 39.

If data on the color bust signal is made to be included in a specific portion of each of the color difference signals supplied to the input terminals 19 and 20 in each horizontal blanking interval, phase data of the color burst signal can be outputted from the circuit 22 correspondingly to the specific portion of the color difference signal in each horizontal blanking interval.

Figure 7:
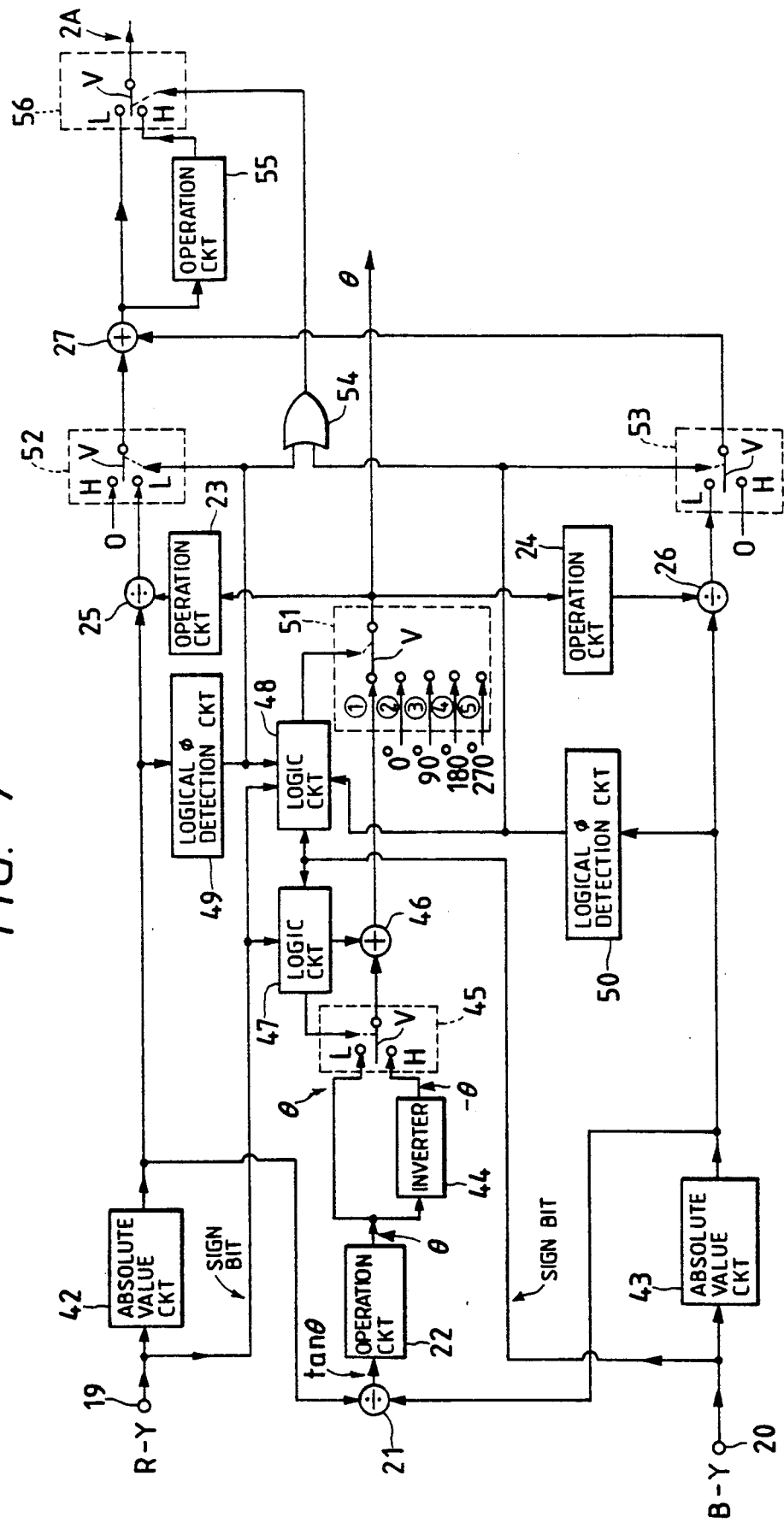
FIG. 7 is a schematic block diagram for showing the construction of a generating circuit for generating data representing color amplitude A and data representing color phase $\theta$ according to the present invention other than the circuits of FIGS. 1-3.
Figure 10:
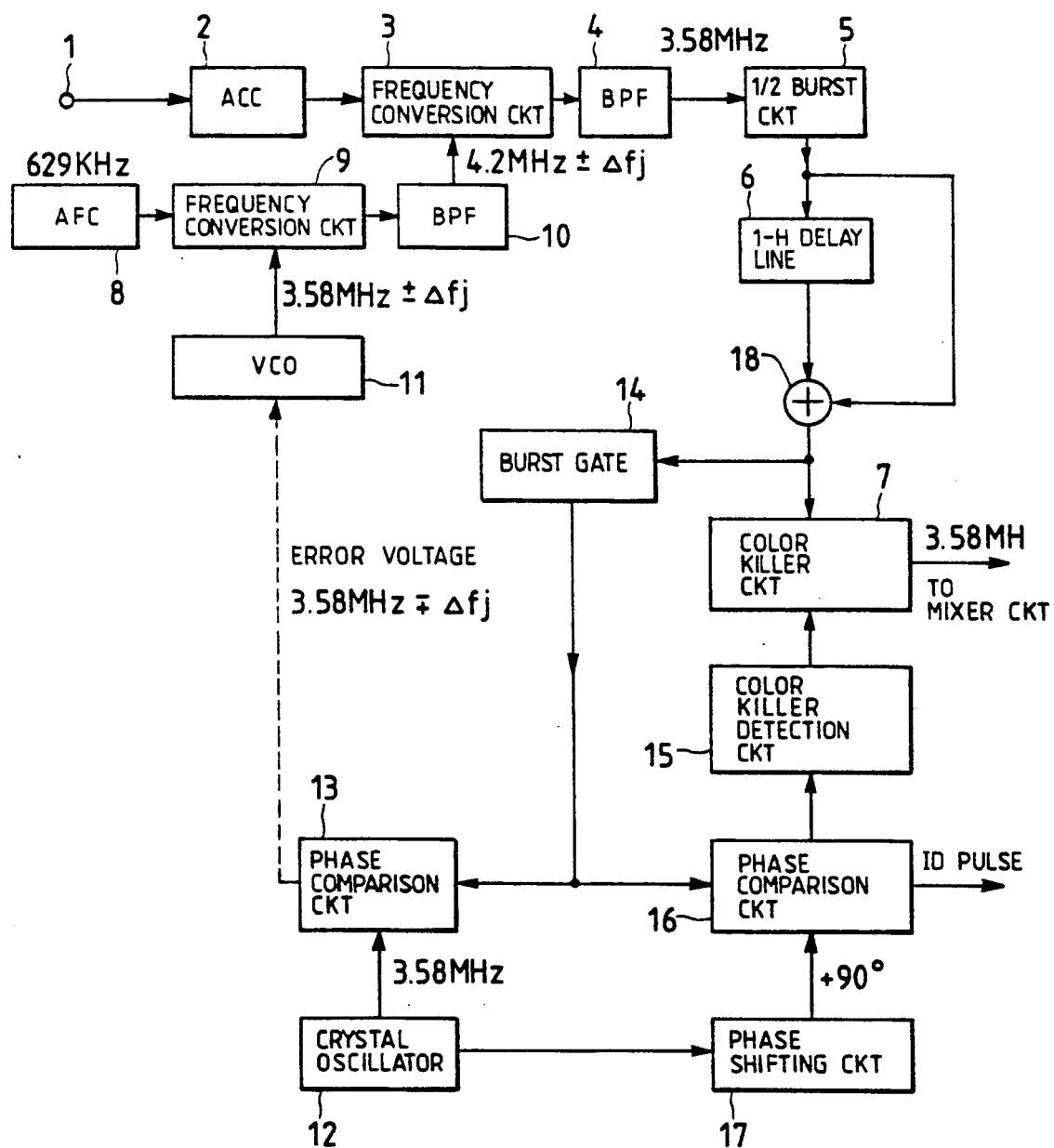
FIG. 10 is a schematic block diagram for showing the construction of the conventional APC circuit.

Next, in FIG. 7, reference numeral 19 designates an input terminal for receiving digital data indicated by one (hereunder described as a color difference signal of red R-Y (=Asin $\theta$)) of two color difference signals having signal forms similar to the forms of two color difference signals to be obtained by effecting the color demodulation of a carrier chrominance signal having an amplitude A and a phase $\theta$ by using two color difference axes intersecting perpendicularly to each other; and 20 another input terminal for receiving digital data indicated by the other (hereunder described as a color difference signal of blue B-Y (=Acos $\theta$)) of the two color difference signals. Incidentally, the digital data supplied to the input terminals 19 and 20 are data represented by two's complement.

Further, it is supposed that digital data indicated by the color burst signal is present at a specific position in at least one of the color difference signals supplied to the input terminals 19 and 20 in the horizontal blanking interval.

In this figure, reference numerals 21, 22, 25, 26 and 55 denotes arithmetic operation circuits; 27 and 46 adders; 42 and 43 absolute values circuits; 44 and inverter; 45, 51-53 and 56 switches; 47 and 48 logic circuits; 49 and 50 a logical zero detection circuit for detecting a logical value 0; and 54 an OR circuit.

Referring to FIG. 7, a signal indicating a sign bit of digital data indicated by the R-Y signal supplied to the terminal 19 is supplied to the absolute value circuit 42 and the logic circuits 47 and 48. Further, a signal indicating a sign bit of digital data indicated by the B-Y signal supplied to the terminal 20 is supplied to the absolute value circuit 43 and the logic circuits 47 and 48.

In the circuit 21 to which the output data Asin $\theta$ is supplied from the absolute value circuit 42 as a dividend, a division operation is performed by using the data Acos $\theta$ outputted from the absolute value circuit 43 as a divisor. Further, the result tan $\theta$ of the division is fed to the arithmetic operation circuit 22.

Then, the circuit 22 produces data corresponding to the phase $\theta$ from the data indicating tan $\theta$ supplied thereto and then outputs the thus produced data to a fixed contact L of the switch 45 and the inverter 44 which inverts the sign of the data indicating the color phase $\theta$ and further supplies the data indicating the inverted phase ($-\theta$) to a fixed contact H of the switch 45.

A movable contact V of the switch 45 is switched to either of the fixed contacts L and H in accordance with a switch control signal outputted from the circuit 47. In FIG. 8, when a control signal output to the switch 45 has a low level L, the movable contact V of the switch 45 is switched to the fixed contact L. In contrast, when the control signal output to the switch 45 has a high level H, the contact V of the switch 45 is switched to the contact H.

The logic circuit 47 is adapted to supply a switch control signal having a level as listed in FIG. 8 to the switch 45 in accordance with the combination of the level H or L of the sign bit of the digital data (hereunder sometimes referred to simply as R-Y data) indicated by the R-Y signal supplied from the terminal 19 and that H or L of the sign bit of the digital data (hereunder sometimes referred to simply as B-Y data) indicated by the B-Y signal supplied from the terminal 20.

Further, the phase angles 0 and 180 degrees as indicated in FIG. 8 are those of a signal to be supplied to the adder 46, which will be described later, in accordance with the combination of the level H or L of the sign bit of the R-Y data and that H or L of the sign bit of the B-Y data.

Incidentally, as is seen from FIGS. 1-3 and 7, the data representing the color phase $\theta$ outputted from the operation circuit 22 is further processed by a signal processing portion composed of the inverter 44, the switch 45, the adder 46, the logical circuits 47 and 48, the logical zero detection circuits 49 and 50 and the switch 51 and is then outputted to an external circuit. This is because the circuit 22 can perform the operation with respect to the phase angle $\theta$ of the data tan $\theta$ inputted thereto only ranging from 0 to 90 degrees in spite of the fact that the phase $\theta''$ of the data tan $\theta''$ inputted thereto ranges from 0 to 360 degrees.

Thus, the signal processing portion comprised of the inverter 44, the switch 45, the adder 46, the logical circuits 47 and 48, the logical zero detection circuits 49 and 50 and the switch 51 is adapted to output the data indicating the phase angle $\theta$ (hereunder sometimes referred to as the color phase data $\theta$) according to the range of the phase angle $\theta''$ of the data tan $\theta''$ inputted to the circuit 22 as follows. Namely, when the angle $\theta''$ of the data tan $\theta''$ inputted to the circuit 22 is within the range between 0 and 90 degrees, the data $\theta''$ outputted from the circuit 22 is further outputted from the signal processing portion without being changed as the color phase data $\theta$. Further, when the angle $\theta''$ of the data tan $\theta''$ inputted to the circuit 22 is within the range between 90 degrees and 180 degrees, data indicating the value obtained by substracting the data $\theta$ outputted from the circuit 22 from 180 degrees is outputted from the signal processing portion as the color phase data $\theta$. Moreover, when the angle $\theta''$ of the data tan $\theta''$ inputted to the circuit 22 is within the range between 180 degrees and 270 degrees, data indicating the value obtained by adding the data $\theta''$ outputted from the circuit 22 to 180 degrees is outputted from the signal processing portion as the color phase data $\theta$. Furthermore, when the angle $\theta''$ of the data tan $\theta''$ inputted to the circuit 22 is within the range between 270 degrees and 360 degrees, data indicating the value obtained by inverting the sign of the data $\theta''$ outputted from the circuit 22 is outputted from the signal processing portion as the color phase data $\theta$.

On the other hand, the data $\theta''$ outputted from the circuit 22 is supplied to the adder 46 as the color phase data $\theta$ or $(-\theta)$ through the switch 45, of which the movable contact V is switched in accordance with the switch control signal above described by referring to FIG. 8.

Further, the data indicating the phase angle 0 or 180 degrees as indicated in the rightmost column of FIG. 8 is fed to the adder 46 which outputs a signal representing the sum of the two kinds of data inputted thereto to a fixed contact ① of the switch 51.

Incidentally, data indicating the phase angle 0, data indicating the phase angle 90 degrees, data indicating the phase angle 180 degrees and data indicating the phase angle 270 degrees are respectively supplied to fixed contacts ②, ③, ④ and ⑤ of the switch 51.

Each of the logical zero detection circuit 49, to which the the output data of the absolute value circuit 42 is fed, and the logical zero detection circuit 50, to which the the output data of the absolute value circuit 43 is fed, supplies output signals having a high level to the logic circuit 48 when digital data inputted thereto has a logical value 0.

Further, the signal indicating the sign bit of the R-Y data and that indicating the sign bit of the B-Y data are also supplied to the logic circuit 48 which generates a switch control signal such that output signals ①, ②, ③, ④ and ⑤ are selectively outputted from the switch 51 according to the combination of the sign bits of the R-Y data and the B-Y data and the outputs of the circuits 49 and 50. Incidentally, in FIG. 9, characters H and L denotes a signal having a high level and a signal having a low level, respectively.

Further, the data outputted from the movable contact of the switch 51 is outputted as the data representing the color phase $\theta$.

Further, the data representing the color phase data $\theta$ is outputted from the switch 51 is also supplied to the circuits 23 and 24. Thus, the data having an absolute value of sin $\theta$ is fed from the circuit 23 to the circuit 25 as a divisor and on the other hand the data having an absolute value of cos $\theta$ is fed from the circuit 24 to the circuit 26 as a divisor.

To the circuit 25, the digital data indicated by the R-Y signal is supplied from the absolute value circuit 42 as a dividend. The operation circuit 25 effects an operation expressed by the equation Asin $\theta$ /sin $\theta$ and thereafter outputs the data representing the color amplitude A to a fixed contact L of the circuit 52.

Similarly, to the circuit 26, the digital data indicated by the B-Y signal is supplied from the absolute value circuit 43 as a dividend. The operation circuit 26 effects an operation expressed by the equation Acos $\theta$ /cos $\theta$ and thereafter outputs the data representing the color amplitude A to a fixed contact L of the circuit 53.

Further, data corresponding to 0 is supplied to fixed contacts H of the switches 52 and 53. Moreover, the control operation of a movable contact V of the switch 52 is performed in accordance with the output data of the circuit 49. Furthermore, the control operation of a movable contact V of the switch 53 is performed in accordance with the output data of the circuit 50.

Incidentally, the output data of the circuits 49 and 50 are used to control the switching operation of a movable contact V of the switch 56, which will be described later, through the OR circuit 54.

After the data representing the color amplitude A outputted from the movable contact of the switch 52 is added to the data sent from the movable contact V of the switch 53 by the adder 27, the resultant data is supplied to a fixed contact L of the switch 56 and to the circuit 55. Further, data representing a color amplitude 2A obtained by doubling the data from the adder 27 in the circuit 55 is fed to a fixed contact of the switch 56.

Then, the data representing the color amplitude 2A is outputted from a movable contact V of the switch 56.

In the embodiments of FIGS. 1-3 and 7, the data representing the color phase $\theta$ outputted from the circuit 22 in a specific portion of the horizontal blanking interval of the color difference signal is data representing the phase $\theta'$ of the color burst signal which is present in the horizontal blanking interval of the color difference signal.

Further, for instance, a latch circuit may be used as the burst gate circuit 29, to which is the color phase data is supplied, in the embodiments of FIGS. 1-3. When a burst gate pulse is applied to the latch circuit used as the burst gate circuit 29 at an intermediate instant in the color burst signal period included in the horizontal blanking interval of the color difference signal, the burst gate circuit 29 continues to output the color phase data latched at the intermediate instant, namely, the data indicating the phase $\theta'$ of the color burst signal which is present in the horizontal blanking interval in the color difference signal until the next burst gate pulse is applied to the burst gate circuit 29.

The data indicating the phase $\theta'$ of the color burst signal outputted from the burst gate circuit 29 is fed to the subtracter 30 as a dividend. In this subtracter 30, a predetermined angle (which is 180 degrees in these embodiments) is subtracted from this data such that an operation can be simply effected by using a small numerical value in the subsequent signal processing circuit.

Further, the data indicating the phase $\theta'$ of the color burst signal outputted from the subtracter 30 is supplied to the subtracters 31 and 33 as a dividend.

The portion composed of the subtracters 31 and 33, the feedback ratio circuit 32 and the frame memory (or the field memory) 34 functions as a phase deviation detecting circuit for generating digital data representing the phase deviation of the color burst signal, which is constructed in the form similar to that of the well-known recursive type noise reducing circuit comprised of the frame memory (or the field memory) 34, the subtracters 31 and 33 and the feedback ratio circuit 32.

Figure 4A:
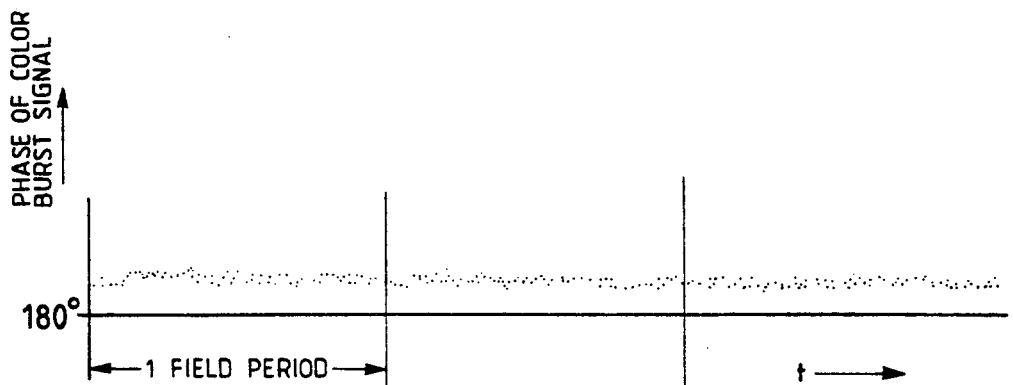
FIGS. 4(a)-4(c) and 5(a)-5(c) are diagrams for illustrating an operation of the circuits of FIGS. 1-3.
Figure 4B:
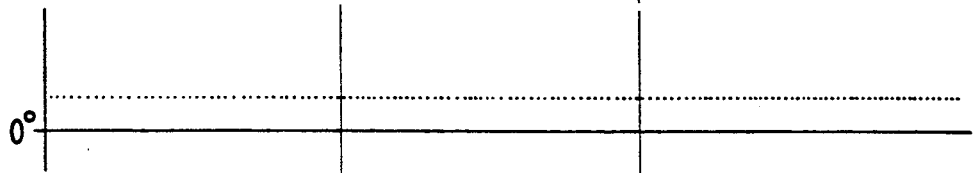
Figure 4C:
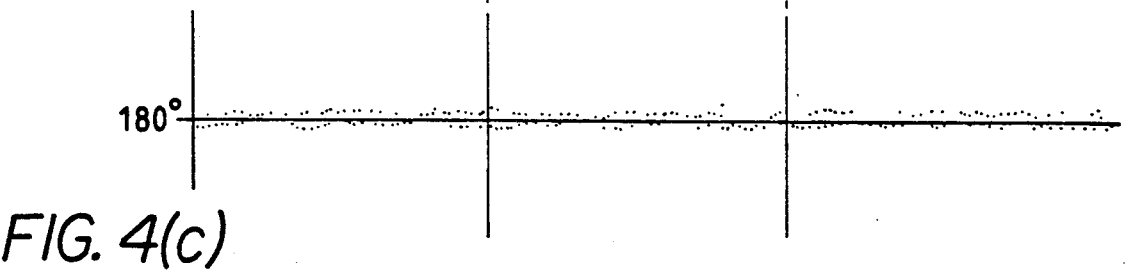
Figure 5A:
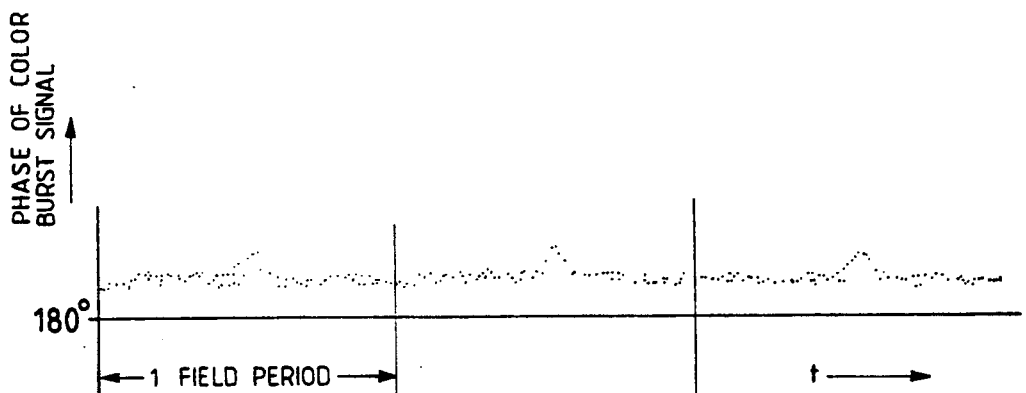
Figure 5B:
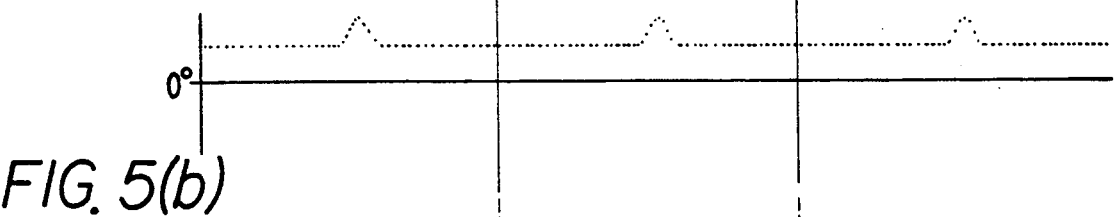

Turning to FIGS. 4 and 5, an operation of the phase deviation detecting circuit will be described hereinbelow. FIG. 4 is a diagram for illustrating data in each portion of the phase deviation detecting circuit in case where the reproduced color signal is not under the influence of the head beat phenomenon. FIG. 5 is a diagram for illustrating data in each portion of the phase deviation detecting circuit in case where the reproduced color signal is under the influence of the head beat phenomenon.

Further, FIG. 4 (a), and FIG. 5 (a) show data representing the phase $\theta'$ of the color burst signal, which is supplied from the subtracter 30 to the subtracters 31 and 33, every horizontal scanning period. Further, FIG. 4

(b) and FIG. 5 (a) show digital data indicating the phase deviation $\Delta\theta$ (hereunder sometimes referred to as the phase deviation) corresponding to the phase deviation of the color burst signal supplied from the subtractor 33 to the subtracter 35 in each horizontal scanning period.

The phase deviation $\Delta\theta$ is data indicating the phase of the color burst signal, from which a noncorrelated information component (namely, a noise) between the successive frames (or fields) is removed, and indicates the residual phase error generated in the color burst signal by the APC operation of the APC circuit every horizontal scanning period.

Thus, in the subtracter 35 to which a signal representing the phase deviation $\Delta\theta$ is supplied as a signal indicating a subtrahend, the phase deviation $\Delta\theta$ is subtracted from the phase of the color difference signal and that of the color burst signal outputted from the operation circuit 22 in each horizontal scanning period. Further, the subtracter outputs to the operation circuits 36 and 37 signals representing digital data $(\theta-\Delta\theta)$ and $(\theta'-\Delta\theta)$, that is, the color phase data obtained by removing the residual phase errors from the phases of the color difference signal and the color burst signal by the APC operation of the APC circuit provided in a pre-stage circuit.

Figure 5C:
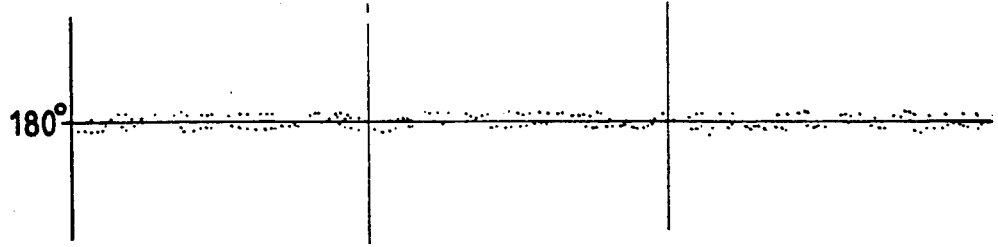

FIGS. 4(c) and 5(c) show the digital data $(\theta'-\Delta\theta)$ representing the color phase of the color burst signal outputted from the subtracter 35.

The operation circuit 36 generates a signal $\sin(\theta-\Delta\theta)$ in the color difference signal period and a signal $\sin(\theta'-\Delta\theta)$ in the color burst signal period on the basis of the color phase data $(\theta-\Delta\theta)$ in the color difference signal period and $(\theta'-\Delta\theta)$ in the color burst signal period, which are supplied thereto, and thereafter supplies color phase data of $\sin(\theta-\Delta\theta)$ and color phase data of $\sin(\theta'-\Delta\theta)$ to the multiplier 38.

Similarly, the operation circuit 37 generates a signal $\cos(\theta-\Delta\theta)$ in the color difference signal period and a signal $\cos(\theta'-\Delta\theta)$ in the color burst signal period on the basis of the color phase data $(\theta-\Delta\theta)$ in the color difference signal period and $(\theta'-\Delta\theta)$ in the color burst signal period, which are supplied thereto, and thereafter supplies color phase data of $\cos(\theta-\Delta\theta)$ and color phase data of $\cos(\theta'-\Delta\theta)$ to the multiplier 39.

As above described, the digital data indicating the color amplitude A is supplied to the multipliers 38 and 39. Thus, the color difference signal (the R-Y signal) obtained by removing the residual phase error from the color burst signal by the APC operation of the APC circuit is outputted from the multiplier 38 to the output terminal 40. Further, the color difference signal (the B-Y signal) obtained by removing the residual phase error from the color burst signal by the APC operation of the APC circuit is outputted from the multiplier 39 to the output terminal 41.

Figure 6:
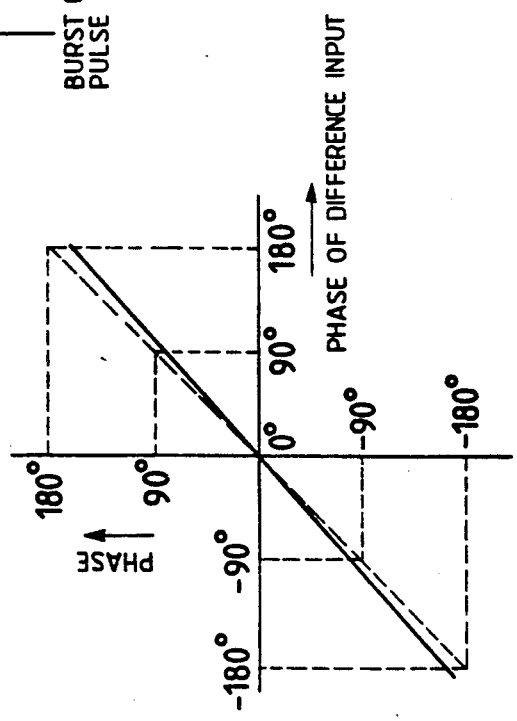
FIG. 6 is a graph for showing the characteristic of a feedback ratio circuit.

FIG. 6 is a graph for showing the input/output characteristic of the feedback ratio circuit 32 provided in the phase deviation quantity data generating circuit. In this graph, the input/output characteristic of the circuit 32 in case where the feed back ratio thereof is 100% is indicated by a dashed line, which is inclined at 45 degrees to the horizontal axis (the x axis) of the graph, for reference.

In the phase deviation detecting circuit, the data of the successive frames (or fields) are highly correlated. Therefore, a high feedback ratio, for instance, 90% (indicated by a solid line in FIG. 6) or so may be employed as the feedback ratio of the circuit 32.

Turning now to FIGS. 11-15, there are shown other color signal circuits embodying the present invention. Further, in FIGS. 11-15, like reference characters denote like or corresponding portions shown in FIGS. 1-3. Thus, the detailed descriptions of the construction and operation of such like or corresponding portions will be omitted for simplicity of description. Incidentally, similarly as in cases of the embodiments of FIGS. 1-3, there can be used a generating circuit, which has the same construction as the circuit of FIG. 7 has, for generating data representing color amplitude A and data representing color phase $\theta$ according to the present invention other than the circuits of FIGS. 1-3. In the embodiments of FIGS. 11-15, a portion composed of the subtracters 31 and 33, the feedback ratio circuit 32 and the frame memory (or the field memory) 34 generates a difference signal data corresponding to the difference of the phase $\theta'$ of a current color burst signal obtained by a burst gate circuit 29, from the average of the phases of the past color burst signals and supplies the difference signal data to a nonlinear signal processing circuit 63. Further, in FIG. 16 which shows the input/output characteristic of a feedback ratio circuit 32, the horizontal axis (the x axis) of the graph indicates a frame difference input; and the vertical axis (the y axis) an output of the circuit 32. Moreover, similarly as in FIG. 6, the input/output characteristic of the circuit 32 in case where the feed back ratio thereof is 100% is indicated by a dashed line, which is inclined at 45 degrees to the horizontal axis, for reference. Furthermore, in the phase deviation detecting circuit of these embodiments, the data of the successive frames (or fields) are highly correlated, so that a high feedback ratio, for instance, 90% (indicated by a solid line in FIG. 16) or so may be employed as the feedback ratio of the circuit 32.

The above described nonlinear signal processing circuit 63 generates an output signal, of which the signal level nonlinearly varies according to the magnitude of the difference signal data inputted thereto, and further supplies the output signal to the subtracter 62 as a signal representing a subtrahend.

Figure 11:
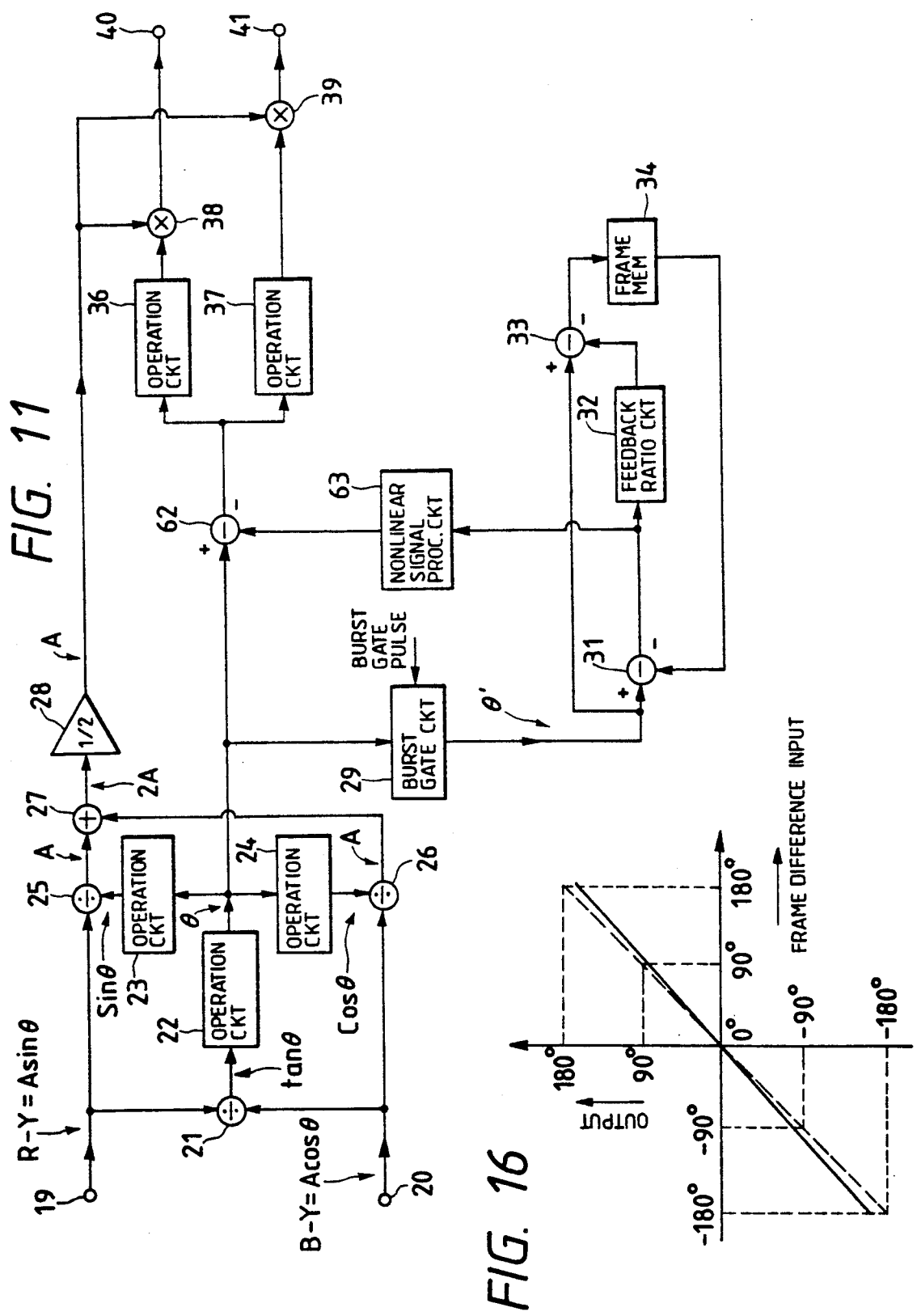
FIGS. 11-15 are schematic block diagrams for showing the construction of other color signal circuits embodying the present invention.
Figures 12, 17:
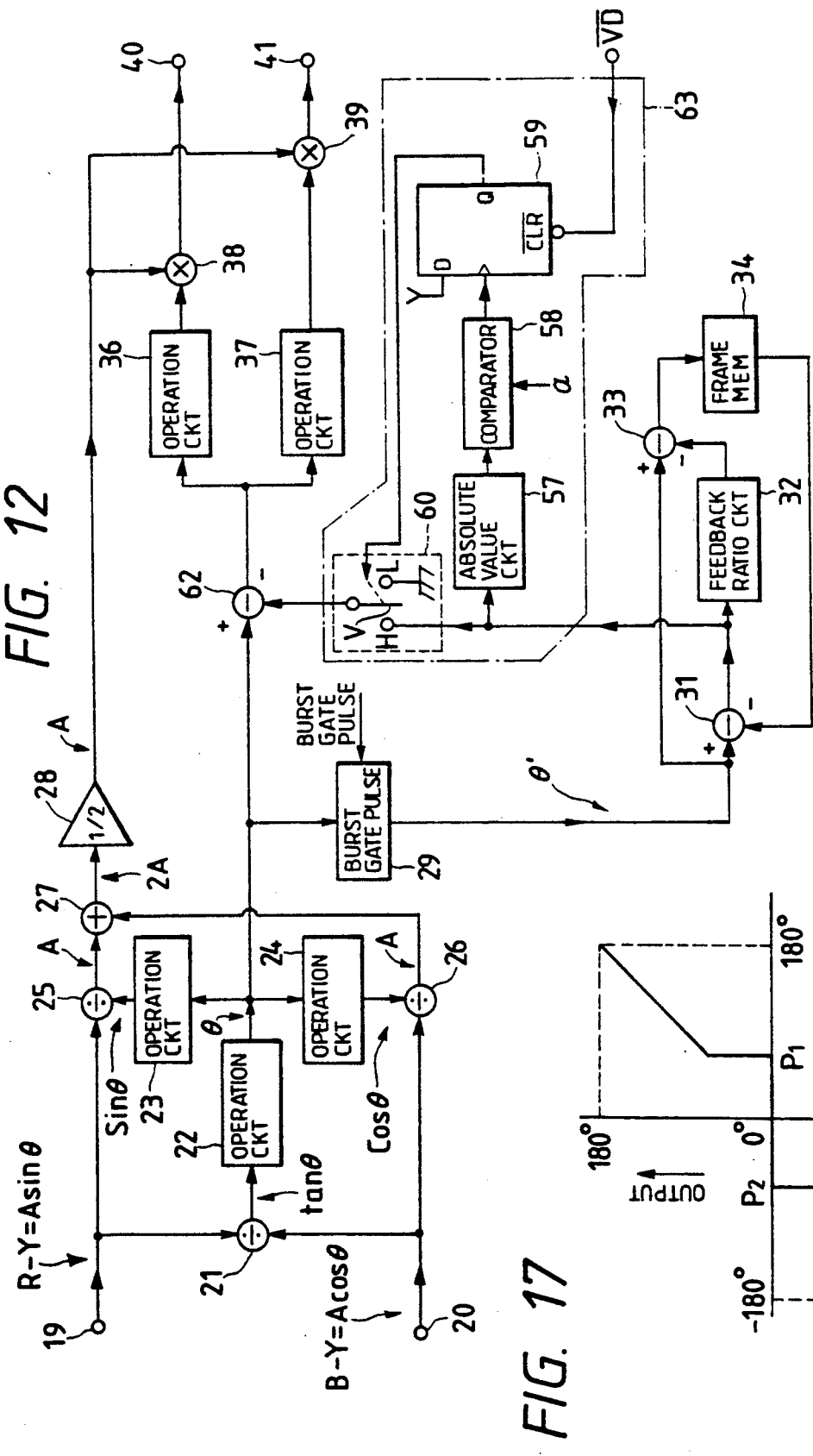
FIGS. 17-20 are graphs for showing the input/put characteristics of nonlinear signal processing circuits of FIGS. 12-15.

In case where a circuit having the input/output characteristic as shown in FIG. 17 (namely, a circuit adapted to output 0 when the frame difference input is within the range from $-P_2$ to $+P_1$, and output data nearly equal to the frame difference input when the frame difference input is within the range from $-180$ degrees to $-P_2$ or within the range from $+P_1$ to 180 degrees) is employed as the nonlinear signal processing circuit 63 of the embodiment of FIG. 11, the phase of the signal at each portion of the embodiment of FIG. 11 becomes as illustrated in FIG. 21.

FIG. 21 (a) illustrates how the phase $\theta'$ of the current color burst signal outputted from the burst gate circuit 29 of FIG. 11 changes with time. Further, FIG. 21 (b) illustrates how the average of the phases of the past color burst signals varies with time. Moreover, FIG. 21 (c) illustrates how the output of the subtracter 31 (that is, the phase obtained by subtracting the average of the phases of the past color signals, which is outputted from the frame memory 34, from the phase $\theta'$ of the current color signal, which is outputted from the burst gate circuit 29) varies with time.

If the phase data of FIG. 21 (c) (namely, the data indicating the frame difference data of the phase of the color burst signal) is inputted to the nonlinear signal processing circuit 63 having the input/output characteristic as shown in FIG. 17, a signal representing the phase data as shown in FIG. 21 (d) is outputted from the circuit 63 to the subtracter 62 as a signal representing a subtrahend.

On the other hand, the color phase signal including the color burst signal having the phase as shown in FIG. 21 (a) is inputted as a signal representing a minuend to the subtracter 62, whereupon the subtrahend as shown in FIG. 21 (d) is thus subtracted from the minuend as shown in FIG. 21 (a). Thereafter, data representing the phase changing as shown in FIG. 21 (e) is outputted from the subtracter 62 to the operation circuits 36 and 37.

As is apparent from the comparison of the phase shown in FIG. 21 (a) and obtained by using a color signal circuit, which is not according to the present invention, with that shown in FIG. 21 (a) and obtained by using the color signal circuit of the present invention, can be easily obtained a color signal, by the use of which the color flicker as occurring in the prior art is substantially reduced, in case of using the color signal circuit of the present invention.

Figure 18:
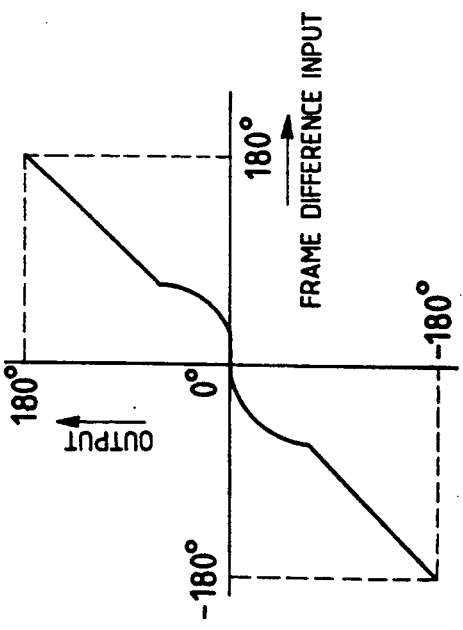

Incidentally, as the nonlinear signal processing circuit 63, another circuit having a desirable characteristic may be employed. For example, may be employed a circuit having the input/output characteristic as shown in FIG. 18 (namely, a circuit adapted to gradually increases the output level thereof as the frame difference input increases from $-P_2$ to $+P_1$, and output data nearly equal to the frame difference input to the subtracter 62 when the frame difference input is within the range from $-180$ degrees to $-P_2$ or within the range from $+P_1$ to 180 degrees).

Next, in the embodiment of FIG. 12, a component comprised of an absolute value circuit 57, a comparator 58, a D-type flip-flop 59 and a switch 60 is employed as the nonlinear signal processing circuit 63.

In the circuit of FIG. 12, the subtracter 31 of a generating circuit 31-34 for generating the difference signal data of the color burst signal (that is, the data corresponding to the difference of the phase $\theta'$ of the current color burst signal obtained by the burst gate circuit 29 from the average of the phases of the past color burst signals) outputs the difference signal data to the absolute value circuit 57 and a fixed contact H of the switch 60.

Further, an output of the absolute value circuit 57 is compared with a preset threshold value $\alpha$ in the comparator 58. If the value of the output of the circuit 57 is greater than the threshold value $\alpha$, a clock signal is supplied from the comparator 58 to the D-type flip-flop 59.

When the level of the output Q of the flip-flop 59 goes high in response to the clock signal, the movable contact V of the switch 60 is switched from the fixed contact L to the contact H.

When the contact V of the switch 60 is in touch with the contact L, a signal indicating a subtrahend 0 is fed to the subtracter 62. In contrast, when the contact V of the switch 60 is in touch with the contact H, the difference signal data outputted from the subtracter 31 is fed to the subtracter 62 as the subtrahend. Therefore, it is apparent that the circuit 63 of FIG. 12 operates as a nonlinear signal processing circuit having an input/output characteristic as shown in FIG. 17.

Figure 13:
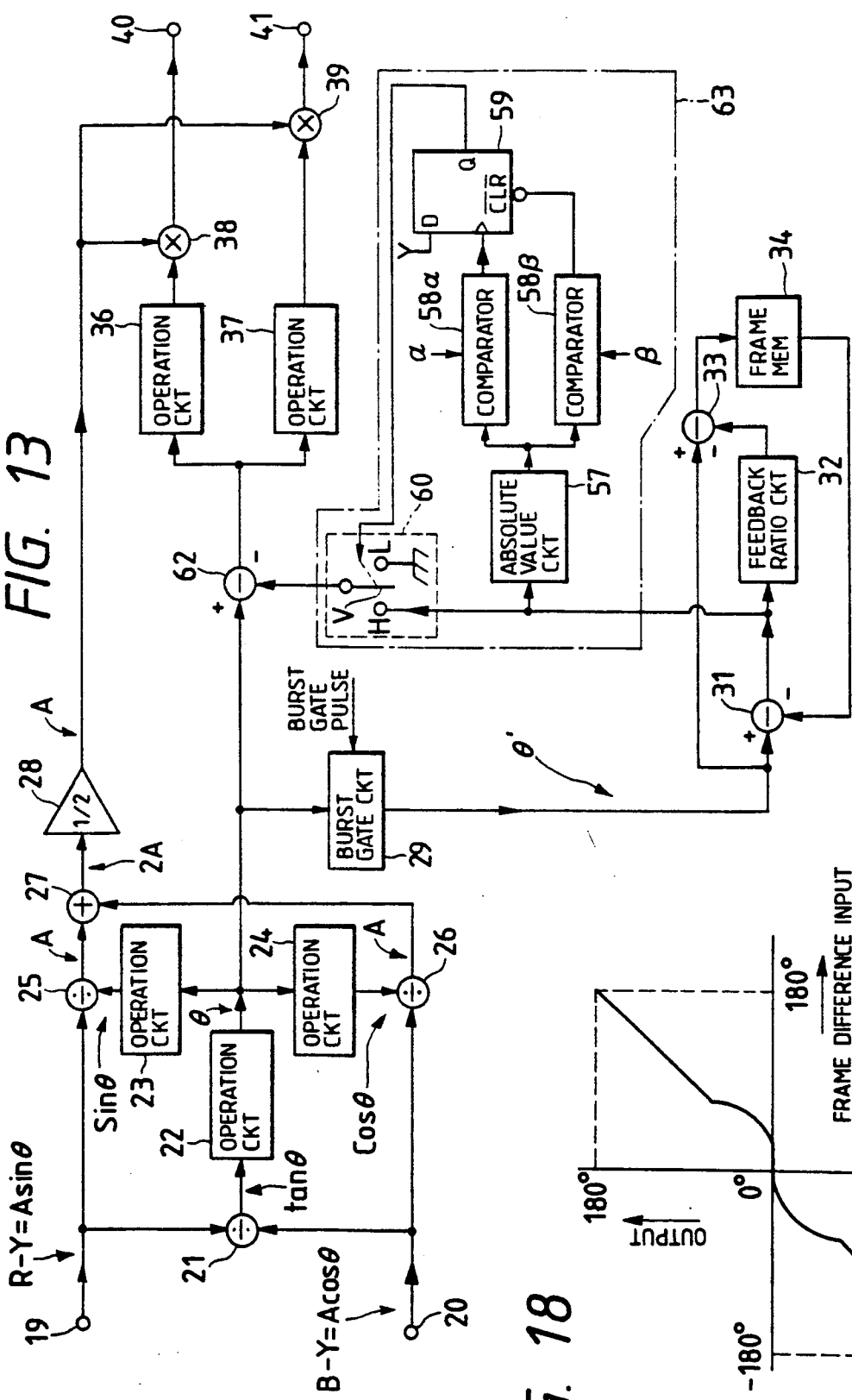

Next, in the embodiment of FIG. 13, a component comprised of an absolute value circuit 57, comparators 58 $\alpha$ and 58$\beta$, a D-type flip-flop 59 and a switch 60 is employed as the nonlinear signal processing circuit 63.

In the circuit of FIG. 13, the subtracter 31 of a generating circuit 31-34 for generating the difference signal data of the color burst signal outputs the difference signal data to the absolute value circuit 57 and a fixed contact H of the switch 60.

Further, an output of the absolute value circuit 57 is compared with a preset threshold value $\alpha$ in the comparator 58$\alpha$ and is also compared with another preset threshold value $\beta$ in the comparator 58$\beta$. Incidentally, the value $\alpha$ is set to be greater than the value $\beta$.

If the value of the output of the circuit 57 is greater than the threshold value $\alpha$, a clock signal is supplied from the comparator 58$\alpha$ to the D-type flip-flop 59.

In contrast with this, if the value of the output of the circuit 57 is less than the threshold value $\beta$, a clearing signal is supplied from the comparator 58$\beta$ to the D-type flip-flop 59.

When the level of the output Q of the flip-flop 59 goes high in response to the clock signal, the position of the movable contact V of the switch 60 is changed from the fixed contact L to the contact H.

When the contact V of the switch 60 is in touch with the contact L, a signal indicating a subtrahend 0 is fed to the subtracter 62. In contrast, when the contact V of the switch 60 is in touch with the contact H, the difference signal data outputted from the subtracter 31 is fed to the subtracter 62 as the subtrahend.

Figures 14, 19:
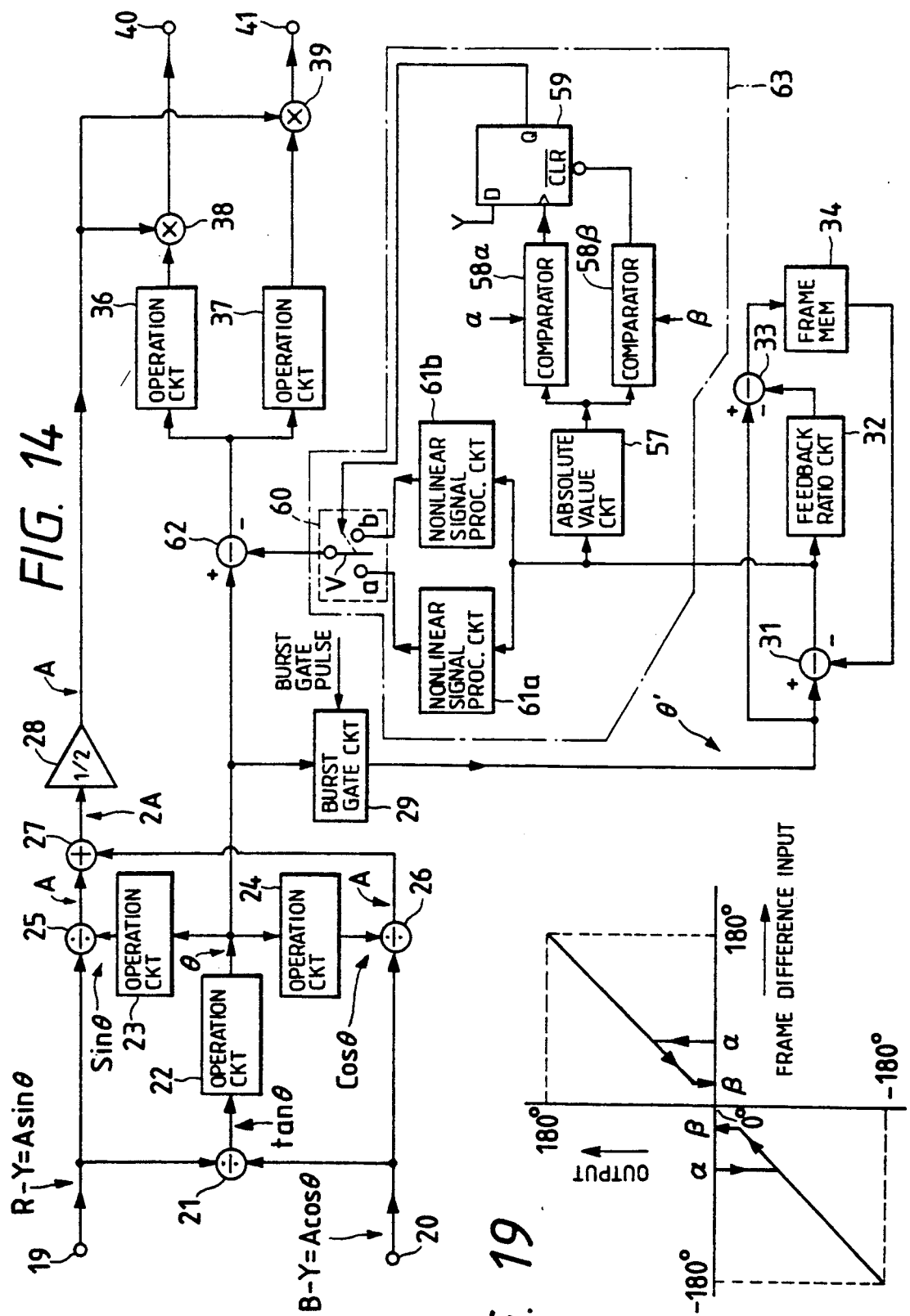

Thus, the circuit 63 of FIG. 13 operates as a nonlinear signal processing circuit having an input/output characteristic as shown in FIG. 19.

FIG. 22 (a) illustrates how the phase $\theta'$ of the current color burst signal outputted from the burst gate circuit 29 of FIG. 13 changes with time. Further, FIG. 22 (b) illustrates how the average of the phases of the past color burst signals outputted from the frame memory 34 of FIG. 13 varies with time. Moreover, FIG. 22 (c) illustrates how the output of the subtracter 31 (namely, the phase obtained by subtracting the average of the phases of the past color signals from the phase $\theta'$ of the current color signal outputted from the burst gate circuit 29) varies with time.

Figure 22A:
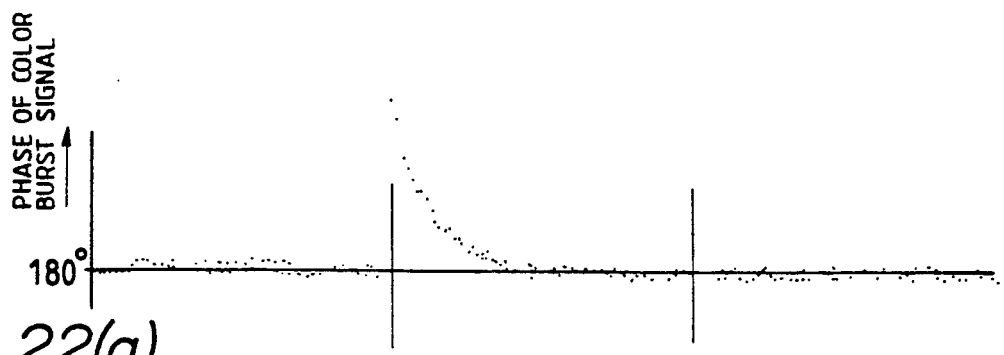
FIGS. 22(a)-22(e) are diagrams for illustrating an operation of the embodiment of FIG. 13.
Figure 22B:
Figure 22C:
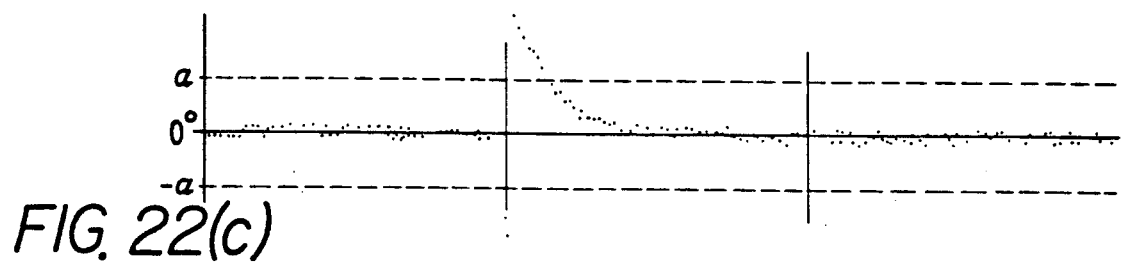
Figure 22D:
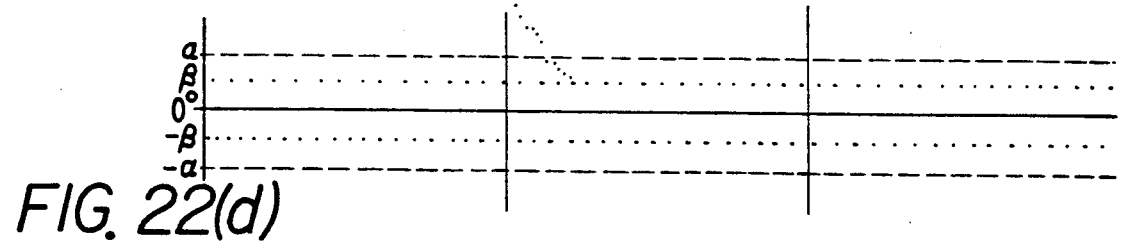
Figure 22E:
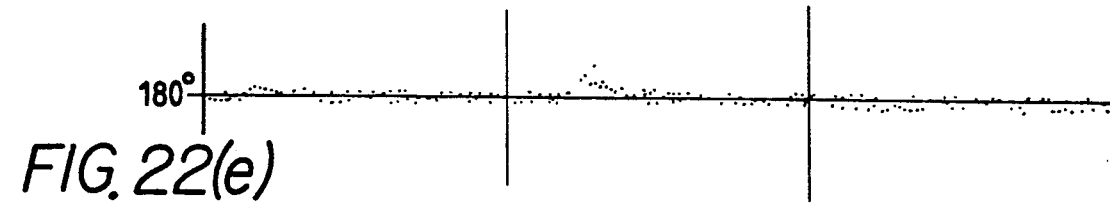
Figure 23A:
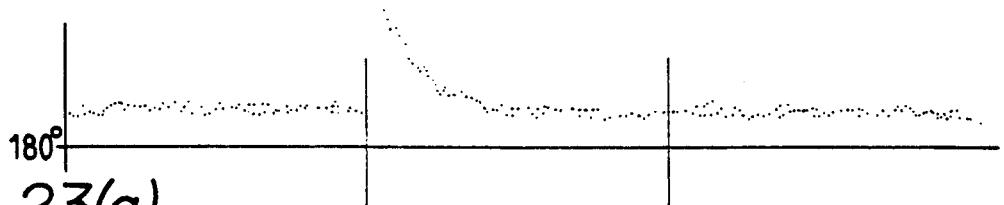
FIGS. 23(a)-23(d) and 24(a)-24(c) are diagrams for illustrating an operation of the embodiment of FIG. 15.
Figure 23B:
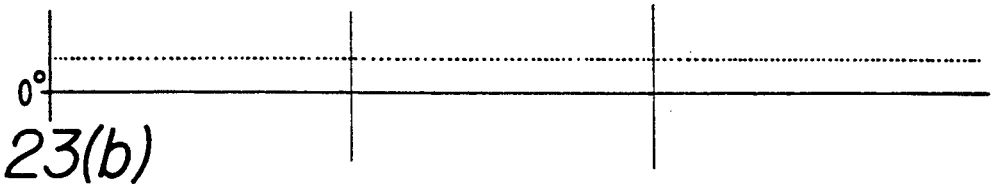
Figure 23C:
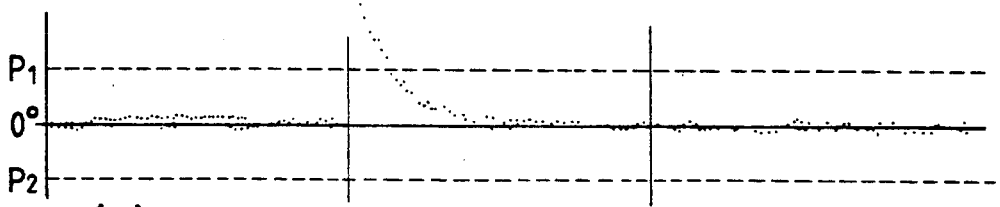
Figure 23D:
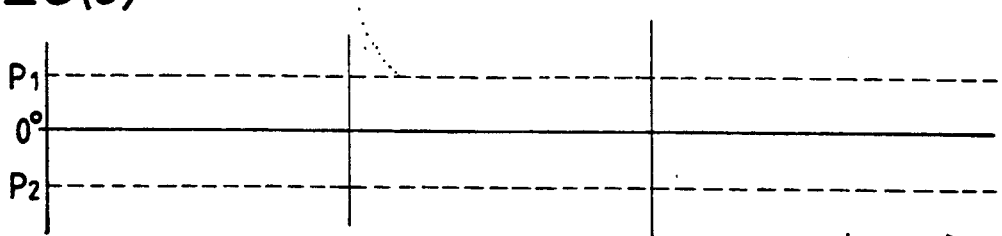

If the phase data of FIG. 22(c) (namely, the data indicating the frame difference data of the phase of the color burst signal) is inputted to the nonlinear signal processing circuit 63 having the input/output characteristic as shown in FIG. 19, a signal representing the phase data as shown in FIG. 22 (d) is outputted from the circuit 63 to the subtracter 62 as a signal representing a subtrahend.

On the other hand, the color phase signal including the color burst signal having the phase as shown in FIG. 22 (a) is inputted as a signal representing a minuend to the subtracter 62, whereupon the subtrahend as shown in FIG. 22 (d) is thus subtracted from the minuend as shown in FIG. 22 (a). Thereafter, data representing the phase changing as shown in FIG. 22 (e) is outputted from the subtracter 62 to the operation circuits 36 and 37.

Next, in the embodiment of FIG. 14 which is similar to that of FIG. 13, a component comprised of an absolute value circuit 57, comparators 58$\alpha$ and 58$\beta$, a D-type flip-flop 59, a switch 60, nonlinear signal processing units 61a and 61b is employed as the nonlinear signal processing circuit 63. For simplicity of description, only the differences between the embodiments of FIGS. 13 and 14 will be described hereinbelow.

In the circuit of FIG. 14, the subtracter 31 of a generating circuit 31-34 for generating the difference signal data of the color burst signal outputs the difference signal data to the absolute value circuit 57, to a fixed contact a of the switch 60 through the unit 61a and to a fixed contact b of the switch 60 through the unit 61b.

Further, when the contact V of the switch 60 is in touch with the contact L, a signal outputted from the unit 61b is fed to the subtracter 62 as a signal indicating a subtrahend. In contrast, when the contact V of the switch 60 is in touch with the contact H, an output signal of the unit 61a is fed to the subtracter 62 as a signal indicating the subtrahend.

Thus, if devices having the input/output characteristic as shown in FIG. 18 are used as the units 61a and 61b, the circuit 63 of FIG. 14 operates as a nonlinear signal processing circuit having an input/output characteristic as shown in FIG. 23.

Figure 15:
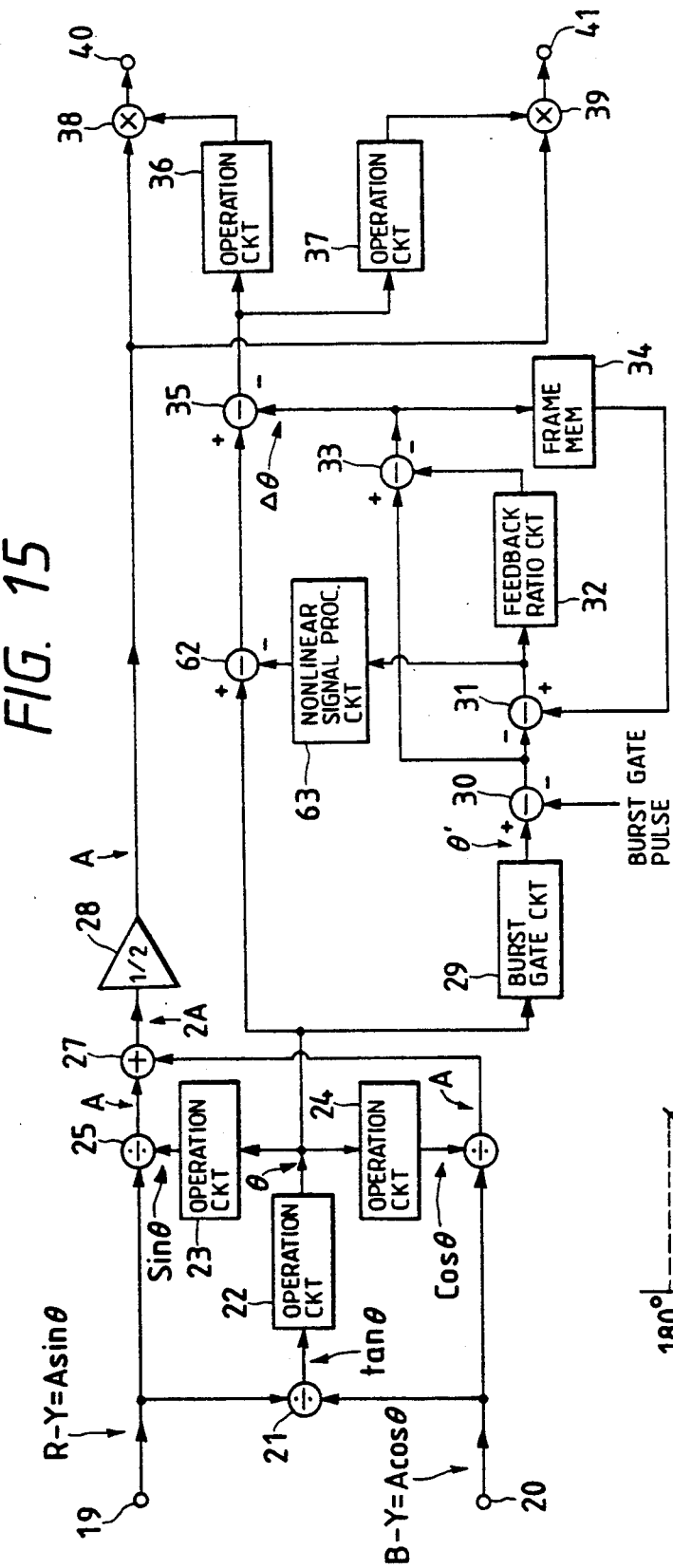
Figure 20:
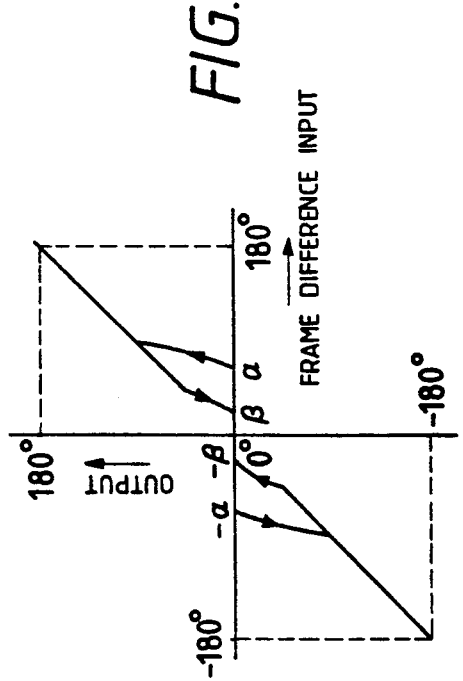
Figure 21A:
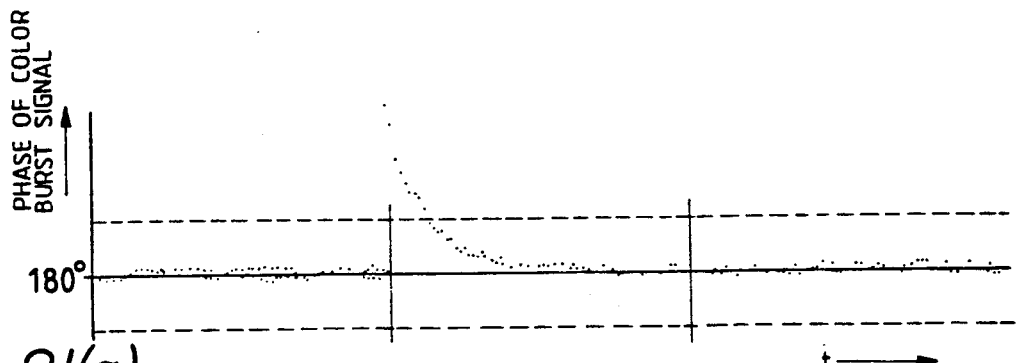
FIGS. 21(a)-21(e) are diagrams for illustrating an operation of the embodiment of FIG. 11.
Figure 21B:
Figure 21C:
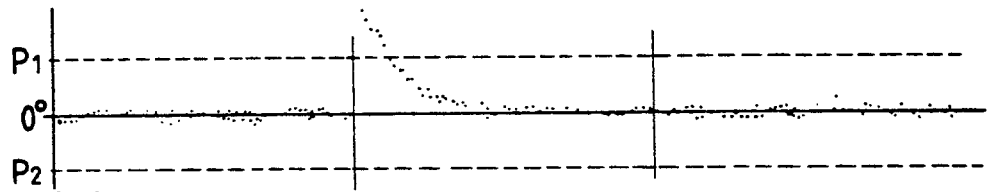
Figure 21D:
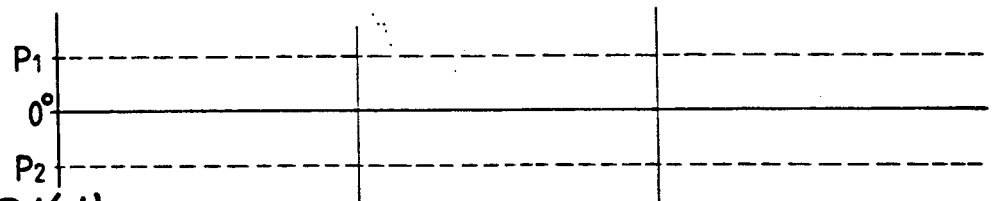
Figure 21E:
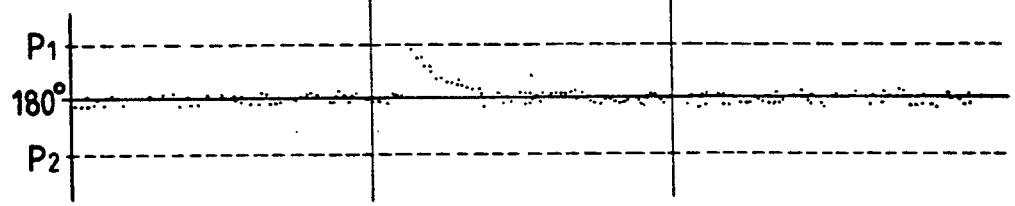

Next, referring to FIG. 15, there is shown another color signal circuit embodying the present invention, in which the phase deviation quantity $\Delta\theta$ of the color burst signal obtained as a subtracter 33 (that is, the residual phase error $\Delta\theta$ included in the color signal by the APC operation of the APC circuit provided in the pre-stage circuit) is subtracted from the color phase signal.

This color signal circuit of FIG. 15 is different in construction from the color signal circuit of FIG. 11 in that an output of a subtracter 62 is fed to a subtracter 35 as a minuend and further an output of the subtracter 33 is also fed to the subtracter as a subtrahend and that an output of the subtracter 35 is supplied to operation circuits 36 and 37. Thereby, the color signal circuit of FIG. 15 has an advantage in that the residual phase error $\Delta\theta$ generated by the APC operation of the APC circuit and included in a reproduced color signal can be removed and that the correction of the hue can be preferably performed.

Further, in the color signal circuit of FIG. 15, a portion composed of the subtracters 31 and 33, a feed back ratio circuit 32 and a frame memory (or a field memory) 34 operates as follows. Namely, (1) difference signal data corresponding to the difference of the phase $\theta'$ of a current color burst signal obtained by a burst gate circuit 29 from the average of the phases of past color signals is supplied from the subtracter 31 to a nonlinear signal processing circuit 63, and (2) data representing the phase deviation quantity $\Delta\theta$ of the color burst signal is supplied from the subtracter 33 to the subtracter 35. Incidentally, a circuit having an input/output characteristic as shown in, for example, FIG. 16 is used as the feedback ratio circuit 32.

Further, the nonlinear signal processing circuit 63 generates an output signal, of which the signal level nonlinearly varies according to the magnitude of the difference signal data inputted thereto, and further supplies the output signal to the subtracter 62 as a signal representing a subtrahend.

Figure 24A:
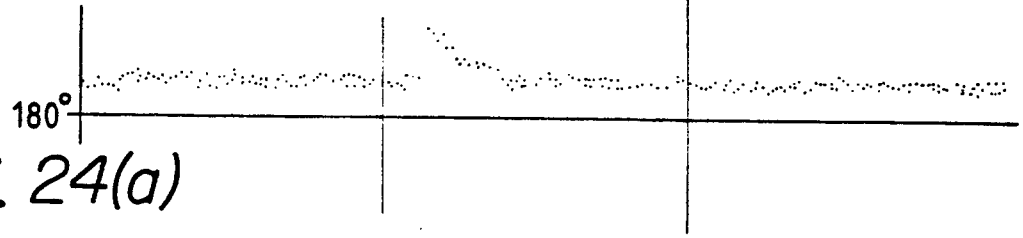
Figure 24B:
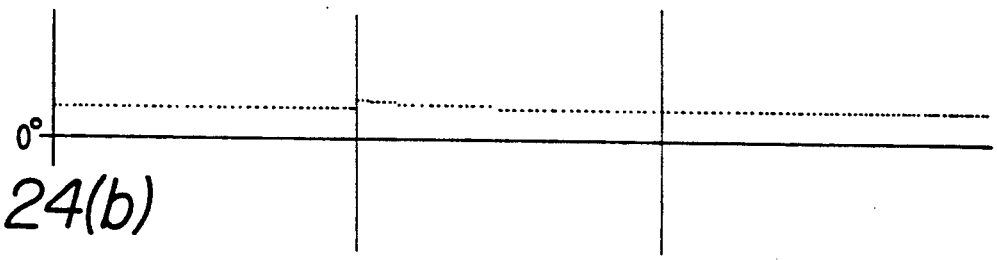
Figure 24C:
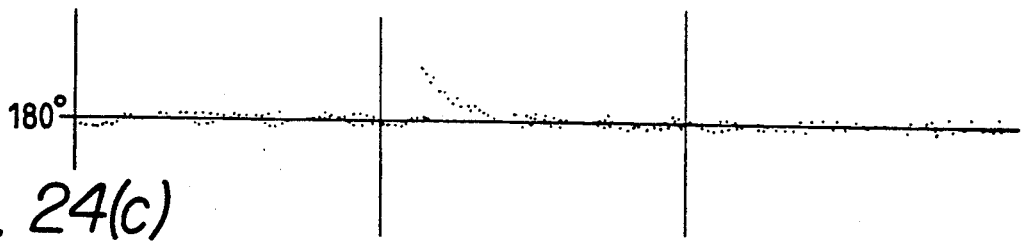

In case where a circuit having the input/output characteristic as shown in FIG. 17 (namely, a circuit adapted to output 0 when the frame difference input is within the range from $-P_2$ to $+P_1$, and output data nearly equal to the frame difference input when the frame difference input is within the range from $-180$ degrees to $-P_2$ or within the range from $+P_1$ to 180 degrees) is employed as the nonlinear signal processing circuit 63 of the embodiment of FIG. 15, the phase of the signal at each portion of the embodiment of FIG. 15 becomes as illustrated in FIGS. 23 and 24.

FIG. 23 (a) illustrates how the phase $\theta'$ of the current color burst signal outputted from the burst gate circuit 29 of FIG. 15 changes with time. Further, FIG. 23 (b) illustrates how the average of the phases of the past color burst signals varies with time. Moreover, FIG. 23 (c) illustrates how the output of the subtracter 31 (that is, the phase obtained by subtracting the average of the phases of the past color signals, which is outputted from the frame memory 34, from the phase $\theta'$ of the current color signal, which is outputted from the burst gate circuit 29) varies with time.

If the phase data of FIG. 23 (c) (namely, the data indicating the frame difference data of the phase of the color burst signal) is inputted to the nonlinear signal processing circuit 63 having the input/output characteristic as shown in FIG. 17, a signal representing the phase data as shown in FIG. 23 (d) is outputted from the circuit 63 to the subtracter 62 as a signal representing a subtrahend.

On the other hand, the color phase signal including the color burst signal having the phase as shown in FIG. 23 (a) is inputted as a signal representing a minuend to the subtracter 62, whereupon the subtrahend as shown in FIG. 23 (d) is thus subtracted from the minuend as shown in FIG. 23 (a). Thereafter, data representing the phase changing as shown in FIG. 24 (a) is outputted from the subtracter 62 to the subtracter 35. Incidentally, the digital data representing the phase deviation quantity $\Delta\theta$ of the color burst signal in each horizontal scanning period as shown in FIG. 24 (b) is outputted from the subtracter 33 to the subtracter 35. Further, in the subtracter 35, the data indicating the phase deviation quantity $\Delta\theta$ is subtracted from the data outputted from the subtracter 62. Then, the subtracter 35 outputs digital data representing the color phase, from which the residual phase error included in the color difference signal and in the color burst signal by the APC operation of the APC circuit provided in the pre-stage circuit is removed, as shown in FIG. 24 (c) to the operation circuits 36 and 37.

Further, the operation circuit 36 supplies the color phase data obtained by effecting an operation on the basis of the digital data representing the color phase supplied thereto to a multiplier 38. On the other hand, the operation circuit 37 supplies the color phase data obtained by effecting an operation on the basis of the digital data representing the color phase supplied thereto to a multiplier 39.

As shown in FIG. 15, the digital data representing the color amplitude A is fed to the multipliers 38 and 39. Thus, a color difference signal (an R-Y signal), from which the residual phase error is removed, is outputted from the multiplier 38 to an output terminal 40. On the other hand, another color difference signal (an B-Y signal), from which the residual phase error is removed, is outputted from the multiplier 39 to an output terminal 41.

As described above, in the color signal circuits of FIGS. 1-3 and 11-15, a circuit having a high feedback ratio is employed as the feedback ratio circuit 32 in order to have sufficient effects thereof. Therefore, in case where an object to be processed by the color signal circuit is switched from a color signal sent form a current signal source to a color signal sent from another new signal source and further the phase of the color signal from the new signal source is largely different from that of the color burst signal corresponding to the color signal supplied from the current signal source to the color signal circuit, it takes relatively long time till the reproduced image returns to normal condition. Namely, the portion 31–34 for generating the difference signal data corresponding to the difference of the phase $\theta'$ of the current color burst signal obtained by the burst gate circuit 29 from the average of the past color burst signals generates the difference signal data in such a manner to obtain what is called flywheel effects in response to the input color burst signal. Thus, in case where the object to be processed by the color signal circuit is switched from the color signal sent form the previous signal source to the color signal sent from the new signal source and further the phase of the color signal from the new signal source is largely different from that of the color burst signal corresponding to the color signal supplied from the previous signal source to the color signal circuit, it takes long time till the difference between the phase of the current color burst signal and the average of the phases of the color burst signals becomes sufficiently small. Therefore, the phase of the color signal, which is to be corrected on the basis of the signal generated in the color signal processing circuit, is largely deviated over long time. Thus, as above described, it takes relatively long time till the reproduced image returns to normal condition. The present invention is accomplished to resolve this problem.

Figure 25:
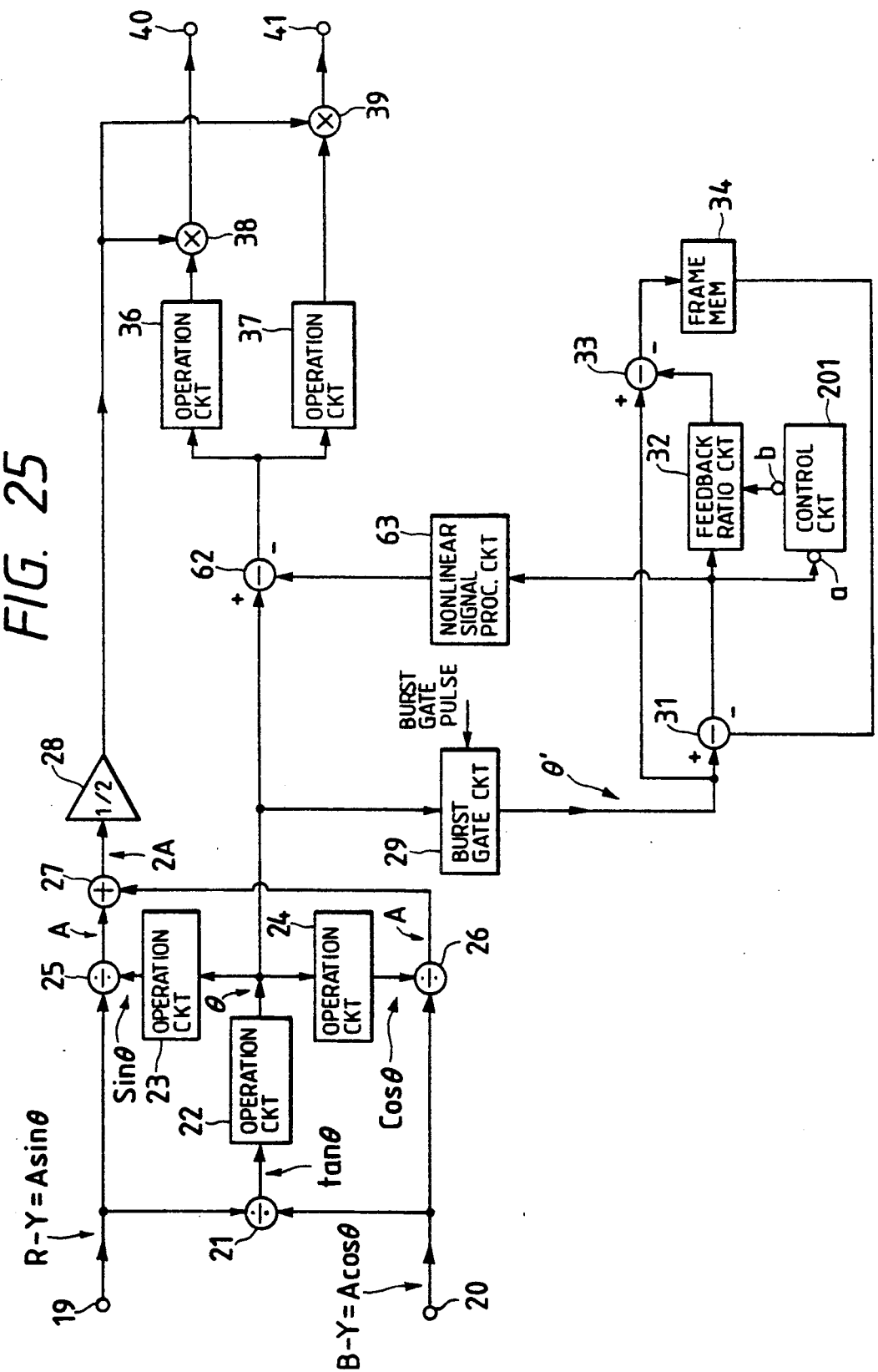
FIGS. 25 and 28 are schematic block diagrams for showing other color signal circuits embodying the present invention.
Figure 28:
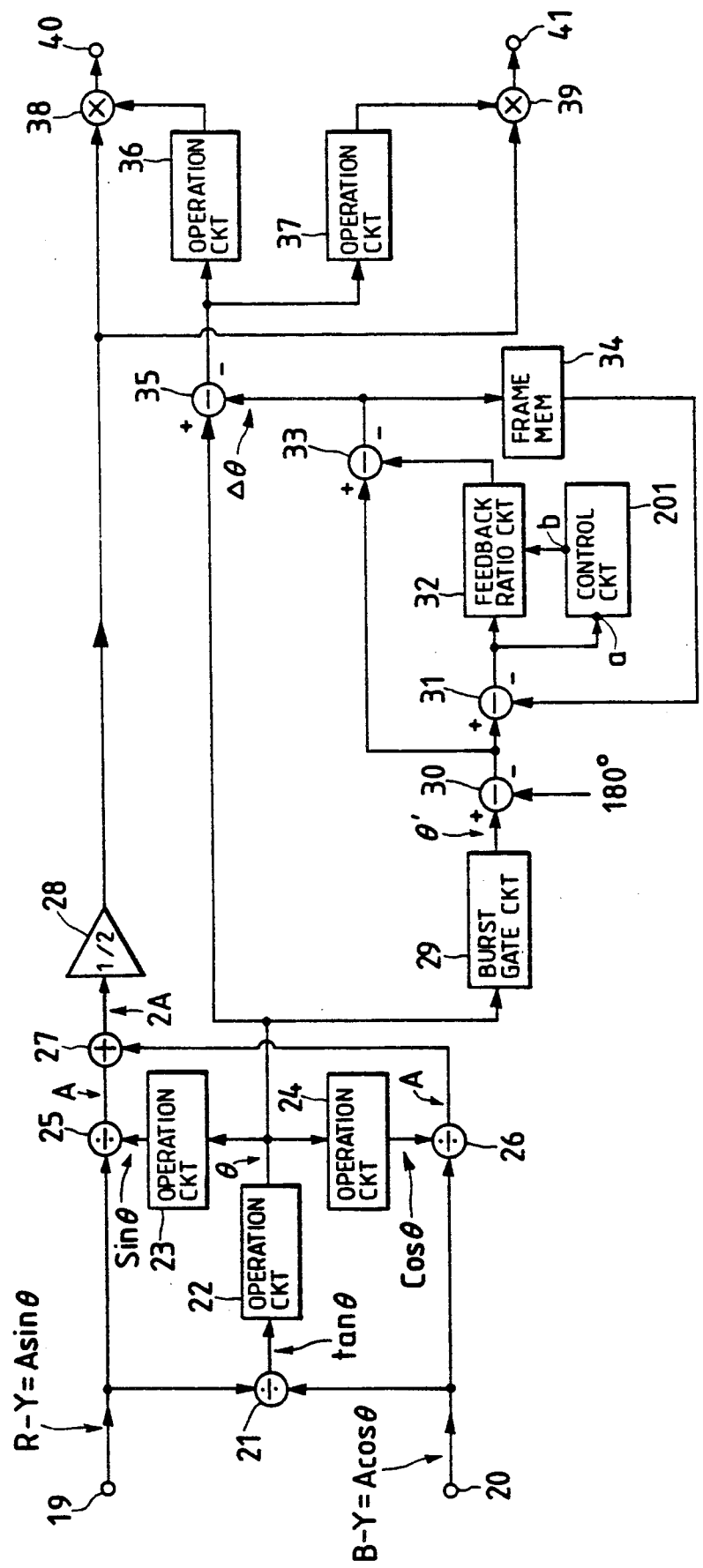
Figure 30:
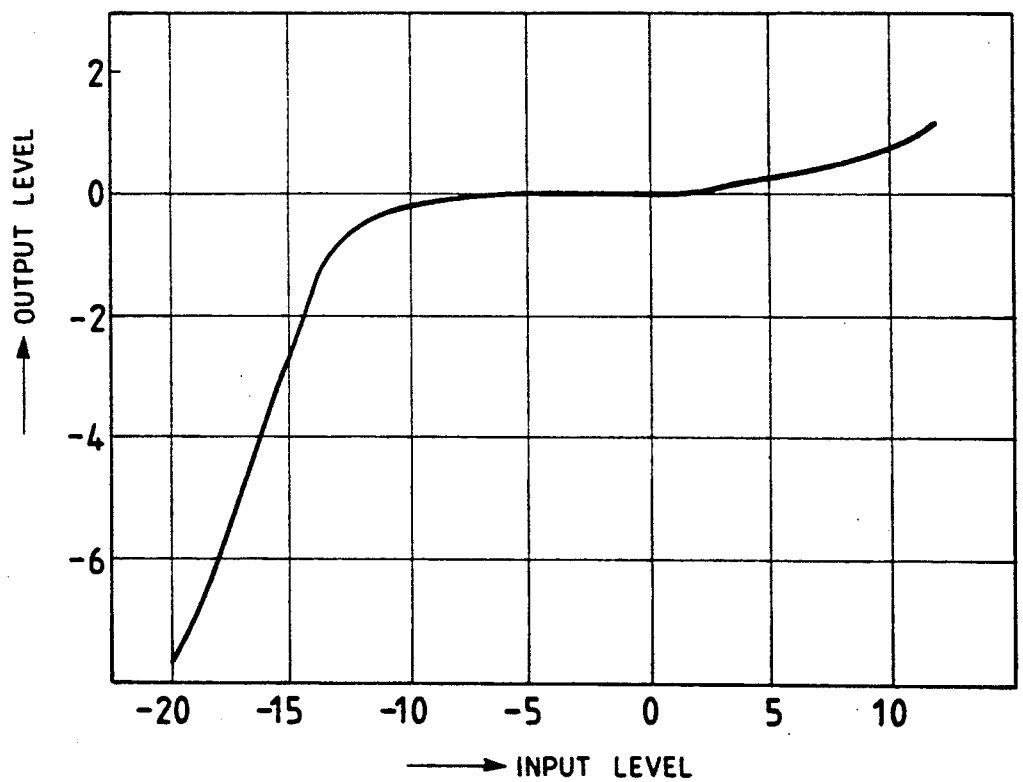
FIG. 30 is a graph for showing the input/output characteristic of the conventional ACC circuit of FIG. 29.

Turning now to FIGS. 25 and 28, there are shown other color signal circuits embodying the present invention devised to resolve the problem as immediately above described. Further, referring to FIGS. 26 and 27, there are shown control circuits which are different in construction from each other. Incidentally, in FIGS. 25-28, like reference characters denote like or corresponding portions shown in FIGS. 1 and 11. Thus, the detailed descriptions of the construction and operation of such like or corresponding portions will be omitted for simplicity of description. Furthermore, similarly as in cases of the embodiments of FIGS. 1-3 and 11-15, there can be used a generating circuit, which has the same construction as the circuit of FIG. 7 has, for generating data representing color amplitude A and data representing color phase $\theta$ according to the present invention other than the circuits of FIGS. 25 and 28. Thus, the description of the construction and operation of the generating circuit will be also omitted.

FIG. 25 shows the construction of the color signal circuit similar to that of the color signal circuit of FIG. 11. However, in this circuit of FIG. 25, the output data of a subtracter 31 is fed to a control circuit 201 and the feed back ratio of a feedback ratio circuit 32 is changed in accordance with the control signal generated by the control circuit 201. Further, FIG. 28 shows the construction of the color signal circuit similar to that of the color signal circuit of FIG. 1. However, in the circuit of FIG. 28, the output data of a subtracter 31 is fed to a control circuit 201 and the feed back ratio of a feedback ratio circuit 32 is changed in accordance with the control signal generated by the control circuit 201.

Further, in the color signal circuit of FIG. 25, difference signal data corresponding to the difference of the phase $\theta'$ of a current color burst signal obtained by a burst gate circuit 29 from the average of the phases of past color signals is supplied from the subtracter 31 to a nonlinear signal processing circuit 63. Moreover, in the circuit of FIG. 28, data representing the phase deviation $\Delta\theta$ of the color burst signal is supplied from the subtracter 33 to a subtracter 35 as a subtrahend.

However, in the color signal circuits of FIGS. 25 and 28, the feedback ratio of the feedback ratio circuit 32 is controlled in accordance with a control signal supplied from an output terminal b of the control circuit 201 to the circuit 32.

Furthermore, the control circuit 201 is provided with a first counting unit for counting the number of data, which are supplied from the subtracter 31 to an input terminal a thereof (that is, data represent the difference of the data indicated by a color phase signal and obtained on the basis of a current color synchronizing signal from the average of past color signals) and are equal to or greater than a predetermined value of the difference, every vertical scanning period. When the number of the vertical scanning periods, in each of which the number counted by the first counting unit exceeds a predetermined number, is in excess of another predetermined number, the control circuit 201 generates a control signal and outputs the control signal from the output terminal b to the feedback ratio circuit 32, thereby reducing the feedback ratio of the circuit 32. Thus, the control circuit 201 is constructed such that it can control the feedback ratio of the feedback ratio circuit 32.

FIGS. 26 and 27 shows examples of such a control circuit 201. In the control circuit 201 of FIG. 26, the absolute value of the output data supplied from the subtracter 31 to the input terminal a is first obtained by the absolute value circuit 202. Then, the thus obtained absolute value data is fed from the circuit 202 to a comparator 203, whereupon the data supplied from the circuit 202 is compared with a preset reference value $\alpha$.

If the data supplied from the circuit 202 is greater than the reference value $\alpha$, the comparator 203 outputs a trigger signal to a monostable multivibrator 204.

Thereafter, pulses generated by the monostable multivibrator 204 in response to the trigger signals are counted by a counter 205. Subsequently, the count obtained by the counter 205 is supplied to a comparator 206. Incidentally, the counter 205 is reset by a signal VD having a vertical scanning period, so that the value of the count sent from the counter 205 to the comparator 206 is a value obtained every vertical scanning period.

Then, in the comparator 206, the value of the count supplied from the counter 205 thereto is compared with a preset reference value $\beta$. If the value of the count is greater than the reference value $\beta$, the comparator 206 outputs a signal, of which the level is high, to a monostable multivibrator 207 as a trigger signal and to a monostable multivibrator 209 through an inverter 208 as a trigger signal.

Further, pulses outputted from the monostable multivibrator 207 are fed to a counter 210 as pulses to be counted. Moreover, pulses outputted from the monostable multivibrator 209 are fed to the counter 210 as a reset signal.

Thus, the value of the count held in the counter 210 corresponds to the number of the vertical scanning periods in which pulses outputted from the monostable multivibrator 207 are successively supplied to the counter 210.

Thereafter, data indicating the value of the count is outputted from the counter 210 to a comparator 211, whereupon the value of the count is compared with a reference value $\lambda$ preliminarily set therein. If the value of the count supplied from the counter 210 is greater than the reference value $\lambda$, the comparator 211 outputs to the output terminal b a signal of which the level is high.

Thus, as above described, the control circuit 201 of FIG. 26 can output the control signal from the output terminal b thereof when the number of the successive vertical scanning periods, in each of which the number of data supplied from the subtracter 31 to the input terminal a thereof (that is, data represent the difference of the data indicated by the color phase signal and obtained on the basis of the current color synchronizing signal from the average of past color signals) greater than a predetermined value of the difference exceeds a predetermined number, is in excess of another predetermined number.

Next, in the control circuit 201 of FIG. 27, the absolute value of the output data supplied from the subtracter 31 to the input terminal a is first obtained by the absolute value circuit 202. Then, the thus obtained absolute value data is fed from the circuit 202 to a comparator 203, whereupon the data supplied from the circuit 202 is compared with a preset reference value $\alpha$.

If the data supplied from the circuit 202 is greater than the reference value $\alpha$, the comparator 203 outputs a trigger signal to a monostable multivibrator 204.

Then, pulses generated in the monostable multivibrator 204 are converted by a serial-parallel converter 212 into parallel data. The serial-parallel converter 212 outputs n-digit output data (n is a predetermined natural number) to an AND circuit 213. Further, the converter 212 is reset by the signal VD having a period equal to the vertical scanning period. Thus, when pulses, of which the number is equal to or greater than n, are outputted from the monostable multivibrator 204 in a vertical scanning period, the AND circuit 213 outputs a signal, of which the level is high, to a data input terminal of a serial-parallel converter 215. Further, an output of the AND circuit 213 is fed to a reset terminal of the converter 215 through an inverter 214.

The converter 215 receives an output of the AND circuit 213 as data if the level of the output of the AND circuit 213 is high and is reset if the level of the output of the AND circuit 213 is low. Therefore, an output of an AND circuit 216, to which m-digit data outputted from the converter 215 is supplied (m is a predetermined natural number), is sent to the output terminal b in case where when pulses, of which the number is equal to or more than n, are outputted from the monostable multivibrator 204 in each of the successive m vertical scanning periods, that is, in case where the number of data supplied from the subtracter 31 to the input terminal a thereof (that is, data represent the difference of the data indicated by the color phase signal and obtained on the basis of the current color synchronizing signal from the average of past color signals) greater than a predetermined value of the difference exceeds a predetermined number, is in excess of another predetermined number.

As above described, the signal, of which the level is high, outputted from the output terminal b changes the ratio of the feedback ratio of the circuit 32 into 0 (or a small value) and causes the portion 31-34 to change the value indicated by the difference signal outputted from the subtracter 31 thereof into a small value in a short period of time.

Thus, in case where an object to be processed by the color signal circuit is switched from a color signal sent form a current signal source to a color signal sent from another new signal source and further the phase of the color signal from the new signal source is largely different from that of the color burst signal corresponding to the color signal supplied from the current signal source to the color signal circuit, the feedback ratio of the feedback circuit 32 is changed into 0 (or a small value) in accordance with the control signal outputted by the control circuit 201 and further the data supplied from the portion 31-34 to the nonlinear signal processing circuit 63 (in case of the embodiment of FIG. 25) or the subtracter 35 (in case of the embodiment of FIG. 28) is also changed into 0 (or another small value). Further, a color phase signal issued from a subtracter 62 of the embodiment of FIG. 25 to the subsequent circuit and a color signal issued from the subtracter 35 to the subsequent circuit make the color phase signals of the color signals supplied from the new signal source to the color signal circuit. Thereby, the defect of the color signal circuits of FIGS. 1-3 and 11-15 can be eliminated.

Figure 31:
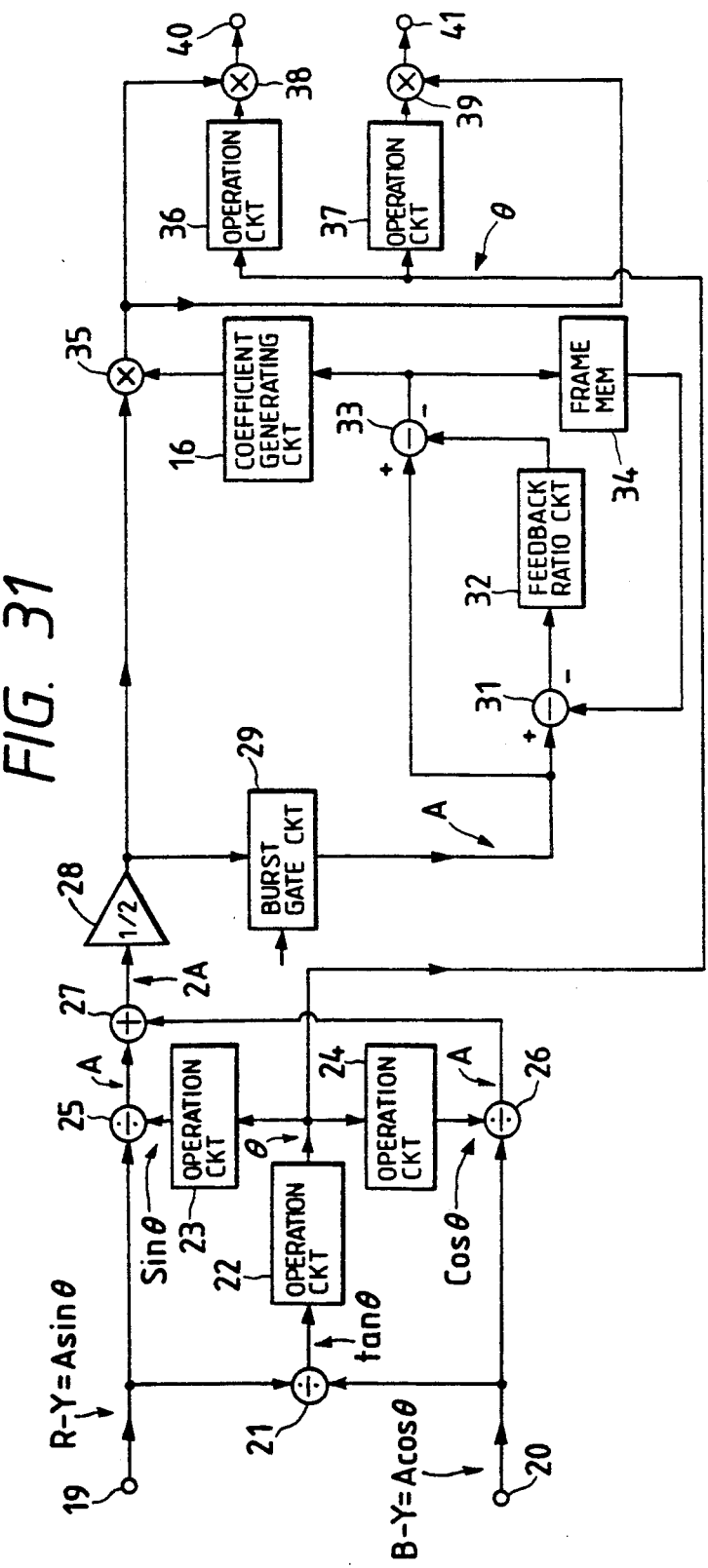
FIG. 31 is a schematic block diagram for showing the construction of further another color signal circuit embodying the present invention.
Figure 29:
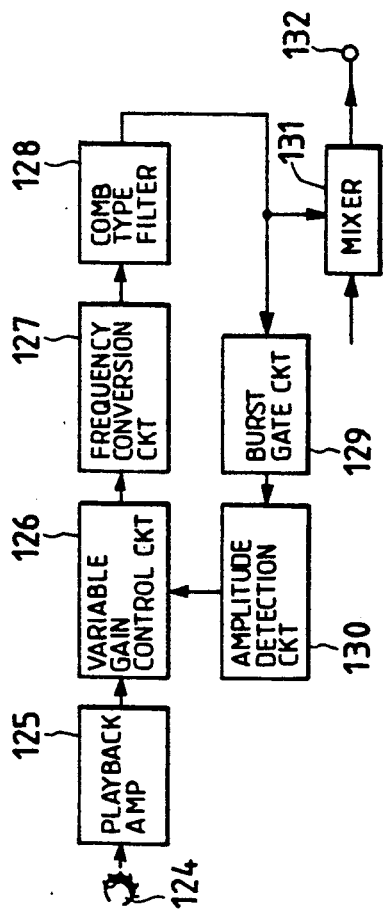
FIG. 29 is a schematic block diagram for showing the construction of the conventional ACC circuit.
Figure 32A:
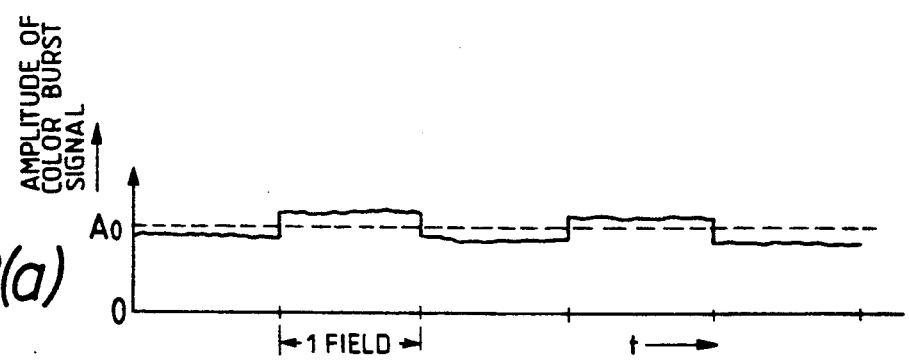
FIGS. 32(a)-32(h) are diagrams for illustrating an operation of the embodiment of FIG. 31.
Figure 32B:
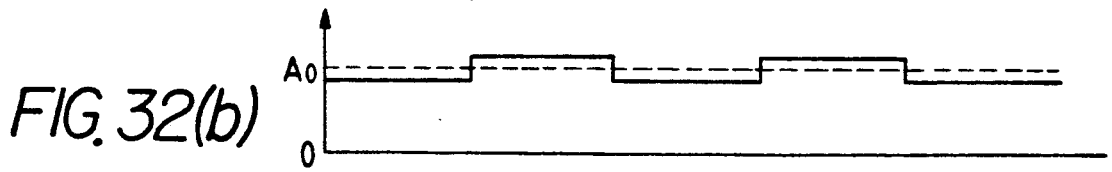
Figure 32C:
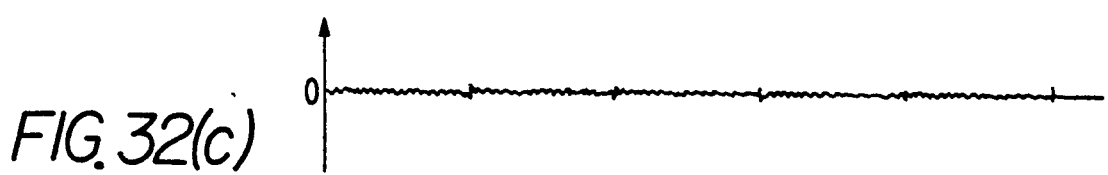
Figure 32D:
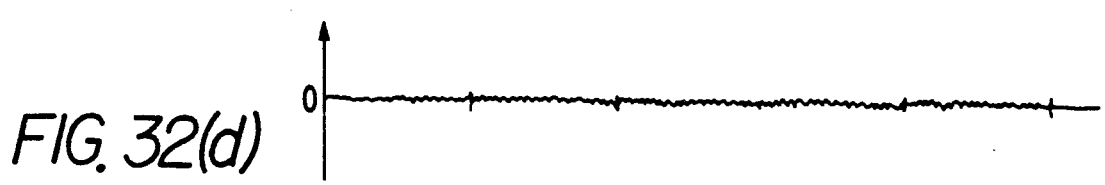
Figure 32E:
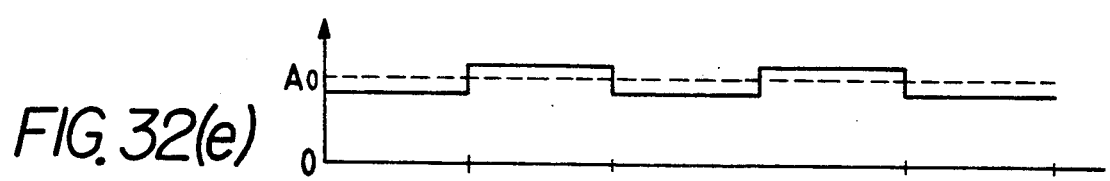
Figure 32F:
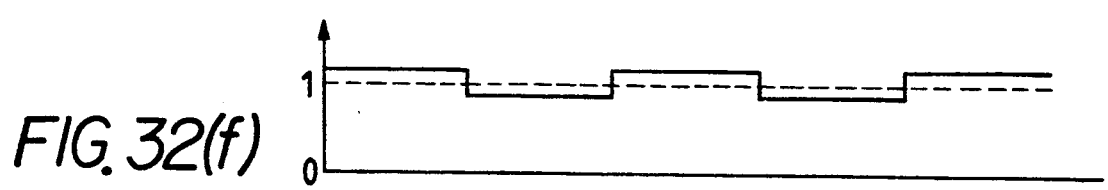
Figure 32G:
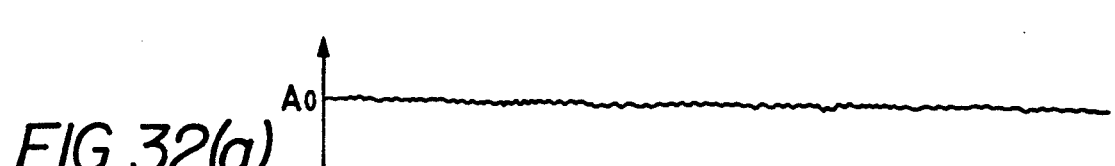
Figure 32H:
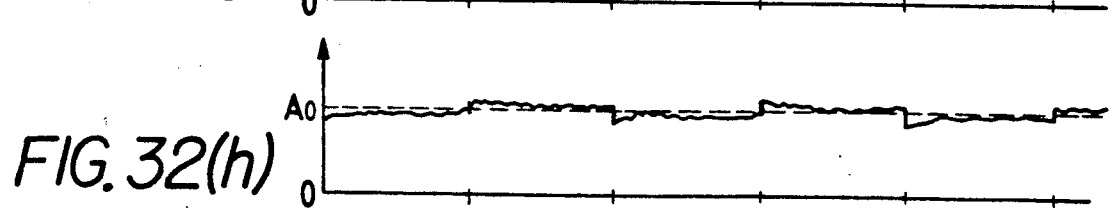

Next, turning to FIG. 31, there is shown still another color signal circuit bodying the present invention. Incidentally, in FIG. 31, like reference characters denote like or corresponding portions shown in FIGS. 1-3. Thus, the detailed descriptions of the construction and operation of such like or corresponding portions will be omitted for simplicity of description. Incidentally, in FIG. 31, reference numeral 16 designates a coefficient generating circuit, which will be described later.

Further, in the circuit of FIG. 31, an operation circuit 22 outputs data indicating a color phase $\theta$ directly to operation circuits 36 and 37.

Moreover, data indicating the value of 2A outputted from an adder 27 is multiplied by ½ by an operation circuit 8. Then, data representing color amplitude A is supplied from the circuit 28 to a multiplier 35 and a burst gate circuit.

Furthermore, the circuit 22 can output data representing the amplitude of the color burst signal corresponding to a specific portion of each horizontal blanking interval of color difference signals supplied to input terminals 19 and 20. Moreover, similarly as in cases of the embodiments of FIGS. 1-3 and 11-15, there is a generating circuit, which has the same construction as the circuit of FIG. 7 has, for generating data representing color amplitude A and data representing color phase $\theta$ according to the present invention other than the circuit of FIG. 31. Further, the description of the construction and operation of the generating circuit will be also omitted for simplicity of description. Moreover, data outputted from the circuit 22, which obtains data at an intermediate instant of a color burst signal period in the horizontal blanking interval of the color difference signal, is data representing the amplitude of the color burst signal.

Further, for instance, a latch circuit may be used as the burst gate circuit 29, to which is the color phase data is supplied, in the embodiments of FIGS. 1-3. When a burst gate pulse is applied to the latch circuit used as the burst gate circuit 29 at an intermediate instant in the color burst signal period included in the horizontal blanking interval of the color difference signal, the burst gate circuit 29 continues to output the color phase data latched at the intermediate instant, namely, the data indicating the amplitude A of the color burst signal which is present in the horizontal blanking interval in the color difference signal until the next burst gate pulse is applied to the burst gate circuit 29.

The data indicating the amplitude A of the color burst signal outputted from the burst gate circuit 29 is fed to subtracters 31 and 33 as a dividend.

The portion composed of the subtracters 31 and 33, the feedback ratio circuit 32 and the frame memory (or the field memory) 34 is a well-known recursive type noise reducing circuit (hereunder sometimes referred to as a noise reducer) comprised of the frame memory (or the field memory) 34, the subtracters 31 and 33 and the feedback ratio circuit 32.

Further, the feedback ratio circuit 32 of the noise reducer has an input/output characteristic as shown in FIG. 16. Furthermore, in the noise reducer for reducing noises in the color burst signal, the data of the successive frames (or fields) are highly correlated, so that a high feedback ratio, for instance, 90% (indicated by a solid line in FIG. 16) or so may be employed as the feedback ratio of the circuit 32.

By the above described noise reducer, the noise is removed from or reduced in the color burst signal. After the noise is reduced, the color burst signal is supplied to the coefficient generating circuit 16 adapted to generate a coefficient such that a predetermined constant value of the amplitude can be obtained by multiplying the value of the amplitude of the color burst signal by the coefficient. The coefficient generating circuit can be constructed by using a translation table.

Thus generated coefficient corresponding to the amplitude of the color burst signal, from which the noise is removed, is supplied from the circuit 16 to a multiplier 35.

Further, the color amplitude signal outputted from an operation circuit 28 is also supplied to the multiplier 35. Thus, the color amplitude signal, of which the amplitude is modified or corrected, is outputted from the multiplier 35 to the multipliers 38 and 39.

Further, the data indicating sin $\theta$ is outputted from an operation circuit 36 to the multipliers 38 and 39. Moreover, the data indicating cos $\theta$ is supplied to the multiplier 39. Thus, a color difference signal (an R-Y signal), of which the signal level is constant, is outputted from the multiplier 38 to an output terminal 40. Further, another color difference signal (a B-Y signal), of which the signal level is constant, is outputted from the multiplier 39 to an output terminal 41.

FIG. 32 is a diagram for illustrating an operation of the color signal circuit of FIG. 31. In this figure, reference character $A_o$ denotes a preset value of the final output amplitude of the ACC (Automatic Chroma level Control) circuit.

FIG. 32 (a) shows the data indicating the amplitude A of the color burst signal, which is fed from the burst gate circuit 29 to the subtracters 31 and 33, in each horizontal scanning period. Further, FIG. 32 (b) shows data indicating the average of the amplitude of the past color burst signals fed from the frame memory (or field memory) 34 to the subtracter 31. Moreover, FIG. 32 (c) shows data indicating the frame difference of the amplitude of the color burst signal outputted from the subtracter 31 in each horizontal scanning period.

Furthermore, FIG. 32 (d) shows data outputted from the feedback ratio circuit 32. FIG. 32 (e) digital data representing the color amplitude of the color burst signal, which noises are reduced in and removed from, outputted from the feedback ratio circuit 32.

Further, FIG. 32 (f) shows the coefficient generated by the coefficient generating circuit 16 to which digital data indicating the color amplitude of the color burst signal of FIG. 32 (e). Moreover, FIG. 32 (g) shows data outputted from the multiplier 35 and obtained by multiplying the data indicating the variable color amplitude, which is fed from the operation circuit 28 to the multiplier 35, by the coefficient generated by the coefficient generating circuit 16 of FIG. 33 (f).

Figure 33:
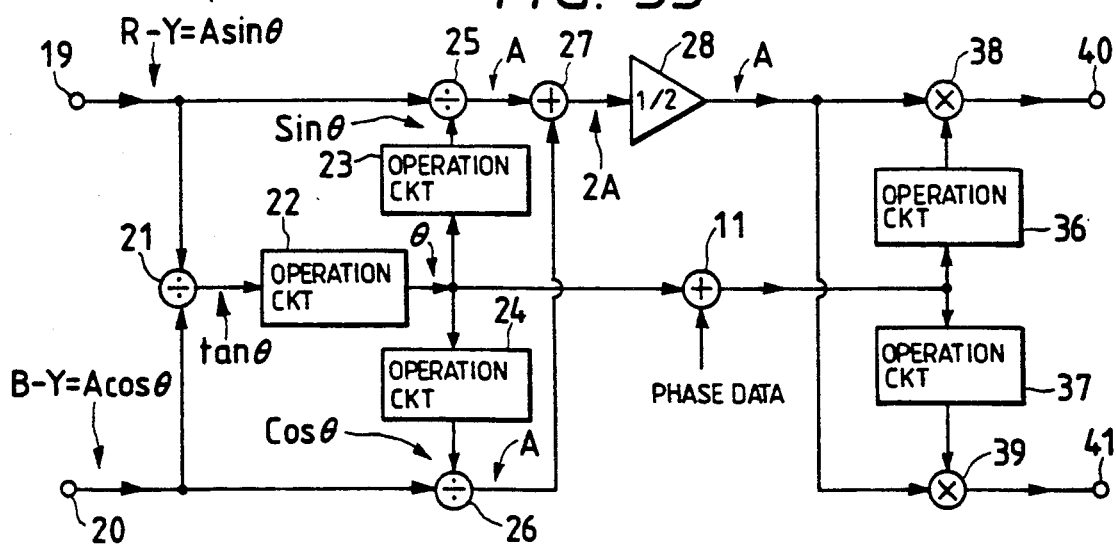
FIGS. 33-35 are schematic block diagrams for showing the construction of other color signal circuits embodying the present invention.
Figure 34:
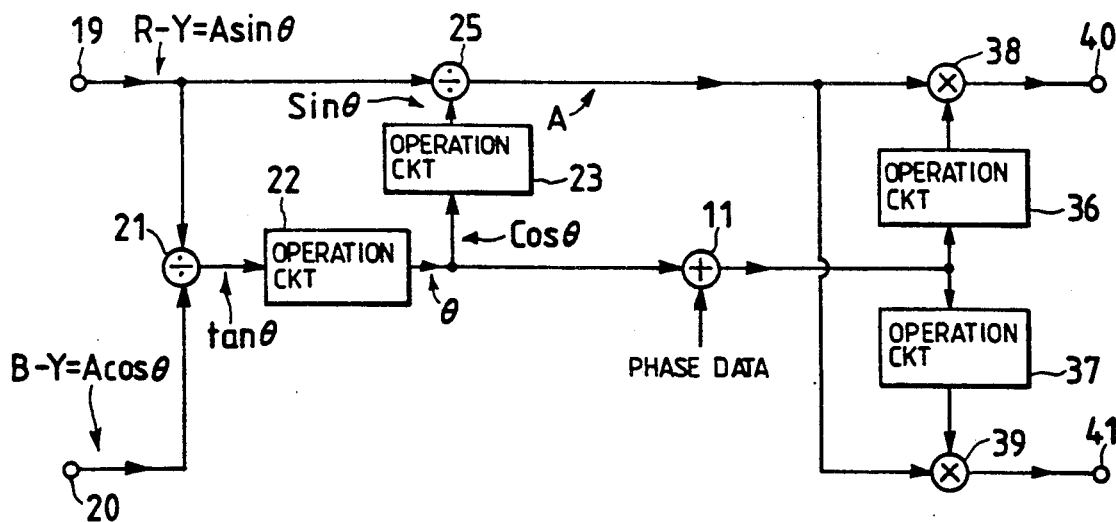
Figure 35:
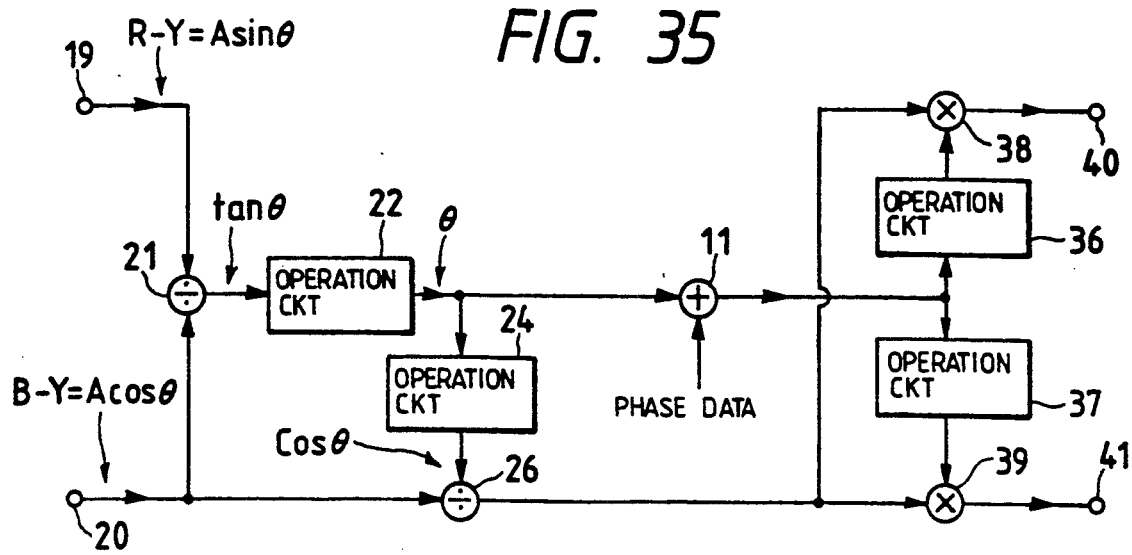

Next, referring now to FIGS. 33-35, there are other color signal circuits embodying the present invention. Incidentally, in FIGS. 33-35, like reference characters denote like or corresponding portions shown in FIGS. 1-3. Thus, the detailed descriptions of the construction and operation of such like or corresponding portions will be omitted for simplicity of description. Incidentally, in FIG. 31, reference numeral 11 designates an adder, to which data representing the color phase $\theta$ is outputted from an operation circuit 22 and further phase data to be used for shifting a phase is also supplied.

Further, similarly as in cases of the embodiments of FIGS. 1-3, 11-15 and 25 and 28, there can be used a generating circuit, which has the same construction as the circuit of FIG. 7 has, for generating data representing color amplitude A and data representing color phase $\theta$ according to the present invention other than the circuits of FIGS. 33 and 35.

In cases of the embodiments of FIGS. 33-35, the phase data for shifting the phase is added to the color phase data outputted by the circuit 22 by the adder 11, so that the phase data of the color phase signal outputted from the circuit 11 is different from the color phase data outputted by the circuit 22 and changes according to the phase data, which is supplied to the adder 11, for shifting the phase. Thus, the hue control is effected by changing a preset value of the phase data for shifting the phase.

A color phase signal outputted from the adder 11 (that is, the color signal of which the phase is shifted by the adder 11 by the phase data supplied thereto for shifting the phase) is supplied to an operation circuit 36, whereupon a signal indicating sin $\theta$ is produced. Further, the signal indicating sin $\theta$ is sent to a multiplier 38, whereupon the data representing sin $\theta$ is multiplied by data indicated by the color amplitude signal A. Finally, the R-Y signal indicating Asin $\theta$ is outputted from the multiplier 38 to an output terminal 40.

Further, the color phase signal outputted from the adder 11 (that is, the color signal of which the phase is shifted by the adder 11 by the phase data supplied thereto for shifting the phase) is supplied to an operation circuit 37, whereupon a signal indicating cos $\theta$ is produced. Then, the signal indicating cos $\theta$ is sent to a multiplier 39, whereupon the data representing cos $\theta$ is multiplied by data indicated by the color amplitude signal A. Finally, the B-Y signal indicating Asin $\theta$ is outputted from the multiplier 39 to another output terminal 41.

Thus, as is apparent from the foregoing description, the hue of the A-Y signal outputted to the output terminal 40 and that of the B-Y signal outputted to the output terminal 41 are changed by the phase data for shifting the phase.

While the preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A color signal processing circuit comprising:
   a conversion means for converting two color difference signals, which are equivalent to two color difference signals to be obtained by performing the color demodulation of a color signal by using two color difference axes intersecting perpendicularly to each other, into a color amplitude signal corresponding to the amplitude of the color signal and a color phase signal corresponding to the phase of the color signal;
   a phase-deviation-quantity signal generating means for generating a phase deviation quantity signal corresponding to the quantity of the phase deviation of the color phase signal outputted from said conversion means in response to a color synchronizing signal;
   a subtraction means for performing a subtraction operation by letting a value indicated by the color phase signal outputted from said conversion means be a minuend and also letting a value indicated by the phase deviation quantity signal outputted from the phase-deviation-quantity signal be a subtrahend; and
   a color difference signal generating means for generating two color difference signals on the basis of the color amplitude signal and the color phase signal outputted from said subtraction means.

2. A color signal processing circuit comprising:
   a data conversion means for converting digital data indicated by two color difference signals, which are equivalent to two color difference signals to be obtained by performing the color demodulation of a carrier chrominance signal including a color burst signal by using two color difference axes intersecting perpendicularly to each other, into digital data indicated by a color amplitude signal corresponding to the amplitude of the color signal and digital data indicated by a color phase signal corresponding to the phase of the color signal;
   a phase-deviation-quantity data generating means for generating digital data representing the quantity of the phase deviation of the color burst signal outputted from said data conversion means correspondingly to digital data indicated by the color burst signal;
   a subtraction means for performing a subtraction operation by letting digital color phase data indicated by the color phase signal outputted from said data conversion means be a minuend and also letting phase deviation quantity data indicated by the phase deviation quantity signal outputted from the phase-deviation-quantity signal be a subtrahend; and
   a color difference signal generating means for generating two color difference signals on the basis of the color digital amplitude data and the color phase data outputted from said subtraction means.

* * * * *